US010395258B2

(12) United States Patent
Akkiraju et al.

(10) Patent No.: US 10,395,258 B2
(45) Date of Patent: Aug. 27, 2019

(54) BRAND PERSONALITY PERCEPTION GAP IDENTIFICATION AND GAP CLOSING RECOMMENDATION GENERATION

(71) Applicant: International Business Machines Corporation, Armonk, NY (US)

(72) Inventors: Rama Kalyani T. Akkiraju, Yorktown Heights, NY (US); Liang Gou, San Jose, CA (US); Haibin Liu, San Jose, CA (US); Jalal U. Mahmud, San Jose, CA (US); Vibha S. Sinha, Santa Clara, CA (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 14/839,178

(22) Filed: Aug. 28, 2015

(65) Prior Publication Data

US 2017/0061448 A1    Mar. 2, 2017

(51) Int. Cl.
G06Q 10/00 (2012.01)
G06Q 30/02 (2012.01)
G06Q 10/06 (2012.01)
G06F 17/18 (2006.01)
G06F 16/955 (2019.01)

(52) U.S. Cl.
CPC ......... *G06Q 30/02* (2013.01); *G06Q 10/0637* (2013.01); *G06Q 30/0201* (2013.01); *G06Q 30/0202* (2013.01); *G06Q 30/0251* (2013.01); *G06Q 30/0278* (2013.01); *G06F 16/955* (2019.01); *G06F 17/18* (2013.01)

(58) Field of Classification Search
CPC ................................................. G06Q 30/0201

USPC ....................................................... 705/7.29
See application file for complete search history.

(56) References Cited

U.S. PATENT DOCUMENTS

| 5,041,972 | A | 8/1991 | Frost |
| 8,275,803 | B2 | 9/2012 | Brown et al. |
| 8,521,590 | B1 | 8/2013 | Hanusch |
| 8,549,061 | B2 | 10/2013 | Rao et al. |
| 8,621,278 | B2 * | 12/2013 | Petukhov ............ G06F 11/0793 714/26 |

(Continued)

FOREIGN PATENT DOCUMENTS

| DE | 102012018385 A1 | 3/2014 |
| KR | 961782 B1 | 6/2010 |

OTHER PUBLICATIONS van Rekom, J., Jacobs, G. & Verlegh, P.W.J. Market Lett "Measuring and managing the essence of a brand personality" (2006) 17: 181-192 (Year: 2006).*

(Continued)

*Primary Examiner* — Matthew S Gart
*Assistant Examiner* — Tyrone E Singletary
(74) *Attorney, Agent, or Firm* — Stephen J. Walder, Jr.; Diana R. Gerhardt

(57) ABSTRACT

Mechanisms are provided to implement a brand personality perception gap assessment engine. The mechanisms receive an inferred brand personality for a specified brand. The mechanisms further receive an intended brand personality for the specified brand. The mechanisms calculate at least one gap between the inferred brand personality and the intended brand personality. The mechanisms output an output indicating aspects of the at least one gap.

19 Claims, 11 Drawing Sheets

| DIMENSION | TRAIT | TOP 5 RATED BRANDS | MEAN | STD | ... |
|---|---|---|---|---|---|
| SINCERITY | DOWN-TO-EARTH | CRACKER BARREL, OLD NAVY, IHOP, LEGO, DICK'S | 4.45 | 0.64 | ... |
| | HONEST | CRACKER BARREL, AMAZON, PETSMART, WALGREENS, PAYPAL | 4.87 | 0.45 | ... |
| | SINCERE | PETSMART, CRACKER BARREL, WALT DISNEY, FARMERS INSURANCE, WALGREENS | 4.45 | 0.64 | ... |
| | ... | ... | ... | ... | ... |
| EXCITEMENT | DARING | VICTORIA'S SECRET, RED BULL, SIX FLAGS, URBAN OUTFITTERS, SAMSUNG | 4.04 | 0.64 | ... |
| | TRENDY | APPLE, FOREVER 21, SEPHORA, STARBUCKS, SAMSUNG | 4.04 | 0.86 | ... |
| | YOUNG | TOYS R US, FOREVER 21, CHILDREN'S PLACE, MTV, LEGO | 4.16 | 0.89 | ... |
| | ... | ... | ... | ... | ... |
| COMPETENCE | INTELLIGENT | APPLE, GOOGLE, IBM, INTEL, MICROSOFT | 4.91 | 0.61 | ... |
| | CORPORATE | IBM, MERRILL LYNCH, WALMART, MICROSOFT, CAPITAL ONE | 5.64 | 0.52 | ... |
| | LEADER | GOOGLE, APPLE, AMAZON, WALT DISNEY, INTEL | 5.14 | 0.53 | ... |
| | ... | ... | ... | ... | ... |
| ... | ... | ... | ... | ... | ... |

(56) References Cited

U.S. PATENT DOCUMENTS

| | | | |
|---|---|---|---|
| 9,043,302 | B1 | 5/2015 | Shimshoni et al. |
| 2006/0190225 | A1 | 8/2006 | Brand |
| 2007/0156478 | A1 | 7/2007 | Breene et al. |
| 2009/0198593 | A1 | 8/2009 | Klug et al. |
| 2009/0287678 | A1 | 11/2009 | Brown et al. |
| 2010/0076844 | A1 | 3/2010 | Christiansen et al. |
| 2010/0114690 | A1 | 5/2010 | Steelberg et al. |
| 2010/0185564 | A1 | 7/2010 | King et al. |
| 2010/0205057 | A1 | 8/2010 | Hook et al. |
| 2011/0004483 | A1 | 1/2011 | Ting et al. |
| 2011/0066587 | A1 | 3/2011 | Ferrucci et al. |
| 2011/0125734 | A1 | 5/2011 | Duboue et al. |
| 2011/0145289 | A1 | 6/2011 | Christiansen et al. |
| 2012/0296701 | A1 | 11/2012 | Breiter |
| 2013/0007055 | A1 | 1/2013 | Brown et al. |
| 2013/0018652 | A1 | 1/2013 | Ferrucci et al. |
| 2013/0060604 | A1 | 3/2013 | Wright et al. |
| 2013/0066886 | A1 | 3/2013 | Bagchi et al. |
| 2013/0151612 | A1 | 6/2013 | Dunn et al. |
| 2013/0159095 | A1 | 6/2013 | Formo et al. |
| 2013/0185357 | A1 | 7/2013 | Goss et al. |
| 2013/0253990 | A1* | 9/2013 | Richards ............... G06Q 10/00 705/7.36 |
| 2013/0311267 | A1 | 11/2013 | Davidson |
| 2014/0032475 | A1* | 1/2014 | Evans .................... G06N 5/048 706/52 |
| 2014/0257990 | A1 | 9/2014 | Cudgma et al. |
| 2014/0258188 | A1 | 9/2014 | Chen et al. |
| 2014/0278786 | A1* | 9/2014 | Liu-Qiu-Yan ...... G06Q 30/0201 705/7.32 |
| 2015/0186923 | A1* | 7/2015 | Gurumoorthy .... G06Q 30/0242 705/14.42 |
| 2015/0358416 | A1* | 12/2015 | Gariepy ................ G06Q 30/02 709/206 |
| 2016/0042428 | A1 | 2/2016 | Gou et al. |
| 2017/0046748 | A1* | 2/2017 | Zhou .................. G06Q 30/0276 |

OTHER PUBLICATIONS

Park, Seong-Yeon et al., "Congruence Between Brand Personality and Self-Image, and the Mediating Roles of Satisfaction and Consumer-Brand Relationship on Brand Loyalty", Asia Pacific Advances in Consumer Research vol. 6, eds. Yong-Uon Ha and Youjae Yi, Duluth, MN : Association for Consumer Research, http://acrwebsite.org/volumes/11859/volumes/ap06/AP-06, 6 pages.

http://fortune.com/global500, Accessed from the Internet Jan. 11, 2016, 1 page.

http://www.glassdoor.com, Accessed from the Internet Jan. 11, 2016, 2 pages.

List of IBM Patents or Patent Applications Treated as Related, Feb. 18, 2016, 2 pages.

U.S. Appl. No. 14/453,081, filed Aug. 6, 2014.

"Fortune 1000 Companies List for 2014", http://www.geolounge.com/fortune-1000-companies-2014-list, Accessed from the Internet Jan. 11, 2016, 79 pages.

"glmnet: Lasso and Elastic-Net Regularized Generalized Line Models", http://cran.r-project.org/web/packages/glmnet, Accessed from the Internet on Jan. 11, 2016, 2 pages.

"The Twitter glossary", https://support.twitter.com/articles/166337-the-twitterglossary, Accessed from the Internet Jan. 11, 2016, 9 pages.

Aaker, David A., "Building Strong Brands", Free Press, Dec. 1995, 20 pages.

Aaker, Jennifer L., "Dimensions of Brand Personality", Journal of Marketing Research, vol. 34, No. 3, Aug. 1997, pp. 347-356.

Aaker, David A., "Measuring Brand Equity Across Products and Markets", California Management Review, vol. 38, No. 3, Mar. 1996, pp. 102-120.

Aaker, Jennifer et al., "When Good Brands Do Bad", Journal of Consumer Research, vol. 31, Jun. 2004, 17 pages.

Abbar, Sofiane et al., "You Tweet What You Eat: Studying Food Consumption through Twitter", In CHI 2015, Apr. 18-23, 2015, 10 pages.

Ambler, T, "Do Brands Benefit Consumers?", International Journal of Advertising, vol. 16, Issue 3, Aug. 1997, pp. 167-198.

Andersen, Poul H., "A Foot in the Door: Relationship Marketing Efforts Towards Transaction-Oriented Customers", Journal of Market-Focused Management, vol. 5, Issue 2, Jan. 2002, pp. 91-108.

Bazarova, Natalya N. et al., "Social Sharing of Emotions on Facebook:Channel Differences, Satisfaction, and Replies", In CSCW 2015, Mar. 14-18, 2015, pp. 154-164.

Brakus, J. J. et al., "Brand experience: What is It? How is It Measured? Does It Affect Loyalty?", Journal of Marketing, vol. 73, May 2009, pp. 52-68.

Buhrmester,, Michael et al., "Amazon's Mechanical Turk: A New Source of Inexpensive, Yet High-Quality, Data?", Perspectives on Psychological Science, vol. 6, No. 1, Jan. 2011, pp. 3-5.

Burnett, John et al., "New Consumers Need New Brands", Journal of Product & Brand Management, vol. 16, No. 5, Aug. 2007, pp. 342-347.

Carroll, David W., "Patterns of Student Writing in a Critical Thinking Course: A Quantitative Analysis", Assessing Writing, vol. 12, No. 3, Jan. 2007, 15 pages.

Chaudhuri, Arjun et al., "The Chain of Effects from Brand Trust and Brand Affect to Brand Performance: The Role of Brand Loyalty", Journal of Marketing, vol. 65, No. 2, Apr. 2001, 14 pages.

Chen, Jilin et al., "Understanding Individuals' Personal Values From Social Media Word Use", CSCW, Feb. 15-19, 2014, pp. 405-414.

De Chernatony, Leslie, "Brand Management Through Narrowing the Gap Between Brand Identity and Brand Reputation", Journal of Marketing Management, vol. 15, Apr. 1999, pp. 157-179.

Dobele, Angela et al., "Controlled Infection! Spreading the brand message through viral marketing", Business Horizons vol. 48, Issue 2, Mar.-Apr. 2005, pp. 143-149.

Fournier, Susan, "Consumers and Their Brands: Developing Relationship Theory in Consumer Research", Journal of Consumer Research, vol. 24, Issue 4, Mar. 1998, pp. 343-373.

Gardner, Burleigh B. et al., "The Product and the Brand", Harvard Business Review, vol. 33, Mar.-Apr. 1955, pp. 33-39.

Golbeck, Jennifer et al., "Predicting Personality with Social Media", CHI 2011, May 7-12, 2011, pp. 253-262.

Goldberg, Lewis R., "An alternative "description of personality": the big-five factor structure.", Journal of Personality and Social Psychology, vol. 59, No. 6, Dec. 1990, pp. 1216-1229.

Gou, Liang et al., "KnowMe and ShareMe: Understanding Automatically Discovered Personality Traits from Social Media and User Sharing Preferences", CHI 2014, Apr. 26-May 1, 2014, pp. 955-964.

Hall, M.A., "Correlation-Based Feature Selection for Discrete and Numeric Class Machine Learning", Proceedings of the Seventeenth International Conference on Machine Learning, Jun. 29-Jul. 2, 2000,8 pages.

Harre, Rom et al., "The Dictionary of Personality and Social Psychology", The MIT Press, Oct. 1986, 2 pages.

Herring, Susan C., "Computer-Mediated Communication: Linguistic, Social, and Cross-Cultural Perspectives", Journal of the American Society for Information Science, vol. 49, No. 9, Jul. 1998, 2 pages.

High, Rob, "The Era of Cognitive Systems: An Inside Look at IBM Watson and How it Works", IBM Corporation, RedBooks, Dec. 12, 2012, 16 pages.

Hutto, C.J. et al., "A Longitudinal Study of Follow Predictors on Twitter", CHI 2013, Apr. 27-May 2, 2013, 10 pages.

Ipeirotis, Panos G., "Demographics of Mechanical Turk", New York University, Leonard N. Stern School of Business, Mar. 2010, 14 pages.

Katz, Daniel, "The Functional Approach to the Study of Attitudes", Public Opinion Quarterly, vol. 24, No. 2, Summer 1960, Downloaded from http://poq.oxfordjournals.org/ at University of Colorado on Jan. 11, 2016, 42 pages.

Lievens, Filip et al., "The Relation of Instrumental and Symbolic Attributes to a Company's Attractiveness as an Employer", Personnel Psychology, vol. 56, Mar. 2003, pp. 75-102.

(56) References Cited

OTHER PUBLICATIONS

Mairesse, Francois et al., "Using Linguistic Cues for the Automatic Recognition of Personality in Conversation and Text", Journal of Artificial Intelligence Research, vol. 30, Nov. 2007, pp. 457-500.
Malar, Lucia et al., "Implementing an Intended Brand Personality: A Dyadic Perspective", Journal of the Academy of Marketing Science, vol. 40, Issue 5, Sep. 2012, pp. 728-744.
Martineau, Pierre, "The Personality of the Retail Store", Harvard Business Review, vol. 36, Jan./Feb. 1958, 8 pages.
Matthews, Tara et al., "They Said What?: Exploring the Relationship Between Language Use and Member Satisfaction in Communities", CSCW 2015, Mar. 14-18, 2015, pp. 819-825.
McCord, M.C. et al., "Deep parsing in Watson", IBM J. Res. & Dev. vol. 56 No. 3/4 Paper 3, May/Jul. 2012, pp. 3:1-3:15.
Montgomery, Douglas C. et al., "Introduction to Linear Regression Analysis, 5th Edition", John Wiley & Sons, New York, Apr. 2012, 10 pages.
Morros, Melinda, "A Longitudinal Study of Personality Development in Older Adults: The Impact of a Volunteer Intervention Program", A Thesis in The Department of Psychology, Concordia University, Montreal, Quebec, Canada, Aug. 2001, 148 pages.
Parker, Brian T., "A Comparison of Brand Personality and Brand User-Imagery Congruence", Journal of Consumer Marketing, vol. 26, No. 3, Apr. 2009, 12 pages.
Pavalanathan, Umashanthi et al., "Identify Management and Mental Health Discourse in Social Media", WWW 2015 Companion, May 18-22, 2015, 7 pages.
Pennebaker, James W. et al., "Linguistic Inquiry and Word Count: LIWC 2001", Erlbaum Publishers, 2001, 23 pages.
Pennebaker, James W. et al., "Linguistic Inquiry and Word Count: LIWC 2007", LIWC2007 software, Operator's Manual, Accessed online Aug. 24, 2015, https://researchspace.auckland.ac.nz/handle/2292/18109, (2007), 13 pages.
Plummer, Joseph T., "How Personality Makes a Difference", Journal of Advertising Research, vol. 24, Nov./Dec. 1985, 5 pages.
Ries, A, "The 22 Immutable Laws of Branding", Symphonya Emerging Issue in Management, n. 1, 2000-2001, pp. 30-34.
Schultz, Don E. et al., "Integrated Marketing Communication: Putting it Together & Making it Work", Journal of the Academy of Marketing Science, vol. 25, No. 1, 1997, 13 pages.
Sirgy, M. J., "Self-Concept in Consumer Behavior: A Critical Review", Journal of Consumer Research, vol. 9, No. 3. Dec. 1982, 15 pages.
Sung, Yongjun et al., "Effects of Brand Personality on Brand Trust and Brand Affect", Psychology & Marketing, vol. 27, No. 7, Jul. 2010, pp. 639-661.
Tausczik, Yla R. et al., "The Psychological Meaning of Words: LIWC and Computerized Text Analysis Methods", Journal of Language and Social Psychology, vol. 29, No. 1, Mar. 2010, pp. 24-54.
Thomas, Kurt et al., "Suspended Accounts in Retrospect: An Analysis of Twitter Spam", IMC '11, Nov. 2-4, 2011, pp. 243-258.
Tibshirani, Robert, "Regression Shrinkage and Selection via the Lasso", Journal of the Royal Statistical, Society. Series B (Methodological), vol. 58, No. 1, Jan. 1996, 23 pages.
Toma, Catalina L. et al., "What Lies Beneath: The Linguistic Traces of Deception in Online Dating Profiles", Journal of Communication, vol. 62, Issue 1, Feb. 2012, 78-97.
Wentzel, Daniel, "The Effect of Employee Behavior on Brand Personality Impressions and Brand Attitudes", Journal of the Academy of Marketing and Science, vol. 37, Issue 3, Sep. 2009, pp. 359-374.
Wu, Tong Tong et al., "Genome-Wide Association Analysis by Lasso Penalized Logjstic Regression", Bioinformatics, vol. 25, No. 6, Mar. 2009, pp. 714-721.
List of IBM Patents or Patent Applications Treated as Related, Aug. 17, 2016, 2 pages.
"Toolkits", GraphLab.org, http://graphlab.org/projects/toolkits.html#collaborative_filtering, accessed on Jul. 21, 2014, 4 pages.
Azoulay, Audrey et al., "Do brand personality scales really measure brand personality?", Brand Management, vol. 11, No. 2, Nov. 2003, pp. 143-155.
Guevremont, Amelie et al., "The impact of brand personality on consumer responses to persuasion attempts", http://www.palgrave-journals.com/bm/journal/v20/n6/full/bm201258a.html, Original Article: Journal of Brand Management, vol. 20, published online Nov. 23, 2012, Abstract accessed on Apr. 3, 2014, 2 pages.
Keller, Kevin L. et al., "The importance of corporate brand personality traits to a successful 21st century business", Brand Management, vol. 14, Nos. 1/2, Sep.-Nov. 2006, pp. 74-81.
Kim, Chung K. et al., "The effect of brand personality and brand identification on brand loyalty: Applying the theory of social identification", Japanese Psychological Research, Special Issue: Consumer Behavior, vol. 43, No. 4, 2001, pp. 195-206.
Lin, Long-Yi, "The relationship of consumer personality trait, brand personality and brand loyalty: an empirical study of toys and video games buyers", Emerald Group Publishing Limited, Journal of Product & Brand Management, vol. 19, No. 1, Mar. 2, 2010, pp. 4-17.
Mell, Peter et al., "The NIST Definition of Cloud Computing", National Institute of Standards and Technology, Information Technology Laboratory, Version 15, Oct. 7, 2009, 2 pages.
Xu, Anbang et al., "Learning How to Feel Again: Towards Affective Workplace Presence and Communication Technologies", CHI 2012, May 5-10, 2012, pp. 839-848.
Yarkoni, Tal, "Personality in 100,000 words: A Large-Scale Analysis of Personality and Word Use Among Bloggers", Journal of Research in Personality, vol. 44, Apr. 2010, pp. 363-373.
Yuan, Michael J., "Watson and healthcare, How natural language processing and semantic search could revolutionize clinical decision support", IBM developerWorks, IBM Corporation, Apr. 12, 2011, 14 pages.
Zhang, Amy X. et al., "Modeling Ideology and Predicting Policy Change with Social Media: Case of Same-Sex Marriage", CHI 2015, Apr. 18-23, 2015, 10 pages.
Malhotra, Naresh K., "Self Concept and Product Choice: An Integrated Perspective", Journal of Economic Psychology, vol. 9, Issue 1, Mar. 1988, 28 pages.
Siguaw, Judy A. et al., "The Brand-personality Scale, An Application for Restaurants", Cornell Hotel and Restaurant Administration Quarterly; vol. 40, Issue 3, Jun. 1999, 9 pages.

\* cited by examiner

| DIMENSION | TRAIT | TOP 5 RATED BRANDS | MEAN | STD | ... |
|---|---|---|---|---|---|
| SINCERITY | DOWN-TO-EARTH | CRACKER BARREL, OLD NAVY, IHOP, LEGO, DICK'S | 4.45 | 0.64 | ... |
| | HONEST | CRACKER BARREL, AMAZON, PETSMART, WALGREENS, PAYPAL | 4.87 | 0.45 | ... |
| | SINCERE | PETSMART, CRACKER BARREL, WALT DISNEY, FARMERS INSURANCE, WALGREENS | 4.45 | 0.64 | ... |
| | ... | ... | ... | ... | ... |
| EXCITEMENT | DARING | VICTORIA'S SECRET, RED BULL, SIX FLAGS, URBAN OUTFITTERS, SAMSUNG | 4.04 | 0.64 | ... |
| | TRENDY | APPLE, FOREVER 21, SEPHORA, STARBUCKS, SAMSUNG | 4.04 | 0.86 | ... |
| | YOUNG | TOYS R US, FOREVER 21, CHILDREN'S PLACE, MTV, LEGO | 4.18 | 0.89 | ... |
| | ... | ... | ... | ... | ... |
| COMPETENCE | INTELLIGENT | APPLE, GOOGLE, IBM, INTEL, MICROSOFT | 4.91 | 0.61 | ... |
| | CORPORATE | IBM, MERRILL LYNCH, WALMART, MICROSOFT, CAPITAL ONE | 5.64 | 0.52 | ... |
| | LEADER | GOOGLE, APPLE, AMAZON, WALT DISNEY, INTEL | 5.14 | 0.53 | ... |
| | ... | ... | ... | ... | ... |
| ... | ... | ... | ... | ... | ... |

*FIG. 1*

| DIMENSION | TRAIT | R2 | USER IMAGERY | EMPLOYEE IMAGERY | MARKETING MESSAGE IMAGERY |
|---|---|---|---|---|---|
| SINCERITY | DOWN-TO-EARTH | 0.43 | ARTICLE_S (-0.13), FUTURE_K (-0.11), GROOMING_V (-0.11), HEARING_S (0.04), HUMANS_S (-0.1),... | MONEY_Q (-0.12), POSITIVE_EFFECT_K (-0.09), RELIGION_V (-0.12), TENTATIVENESS_Q (0.15), ... | ASSENTS_K (0.14), DISCREPANCY_Q (0.08), PAST_M (0.08), PREPOSITIONS_M (-0.07), TV_MOVIES_Q (-0.07), TV_MOVIES_V (-0.11), ... |
| | HONEST | 0.18 | COMMUNICATION_Q (-0.18), HEARING_S (0.13), MONEY_V (-0.07), OPTIMISM_K (-0.04), SEEING_Q (0.06),... | NA | ANGER_Q (-0.14), ASSENTS_K (0.16), PAST_M (0.09), TV_MOVIES_V (-0.33), ... |
| | SINCERE | 0.21 | ANXIETY_K (0.03), COMMUNICATION_S (0.06), DISCREPANCY_K (-0.06), FUTURE_K (-0.09), HUMANS_S (-0.07),... | CERTAINTY_Q (0.16), COMMUNICATIONS_S (0.13), EXCLUSION_K (-0.07), FAMILY_Q (0.12), FILLERS_Q (-0.06), MUSIC_M (-0.16)... | ACHIEVEMENT_K (0.07), ANGER_Q (-0.07), ASSENTS_K (0.10), HEARING_K (0.07), MONEY_M (-0.14),... |
| ⋮ | ⋮ | ⋮ | ... | ... | ... |
| COMPETENCE | INTELLIGENT | 0.50 | ANGER_Q (-0.12), DISCREPANCY_K (-0.14), PAST_K (-0.09),... | ALL_PRONOUNS_K (0.01), DOWN_Q (-0.09), FUTURE_Q (0.1), MUSIC_M (-0.15), NEGATIONS_K (0.06),... | ARTICLES_M (0.05), ASSENTS_K (0.03), JOB_Q (0.13), TOTAL_1ST_PERSON_Q (-0.06),... |
| | CORPORATE | 0.27 | HUMANS_K (0.07), OCCUPATION_V (0.09), TOUCHING_M (-0.09),... | CERTAINTY_K (0.10), DEATH_M (0.08), GROOMING_Q (-0.09), NEGATIONS_K (0.03),... | SEXUAL_M (-0.08),... |
| ⋮ | ⋮ | ⋮ | ... | ... | ... |

BRAND PERSONALITY PERCEPTION GAP IDENTIFICATION AND GAP CLOSING RECOMMENDATION GENERATION

BACKGROUND

The present application relates generally to an improved data processing apparatus and method and more specifically to mechanisms for performing brand personality perception gap identification and gap closing recommendation generation.

The term "brand personality," first introduced by Martineau, "The Personality of the Retail Store," Harvard Business Review, 36, 1958, pp. 47-55, refers to a set of human characteristics associated with a brand or trademark. A brand has a personality because people tend to associate human attributes with brands. For example, the Apple™ brand is considered by many to be a "young" brand while Texas Instruments™ is considered by many to be a relatively "old" brand. Within thirty years of Martineau's introduction to the concept of brand personality, brand personality became widely accepted by both marketing scholars and practitioners as an effective means of business success. Brand personality is a key component of brand performance, such as brand identification, brand trust, and brand loyalty.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which when executed by the processor cause the processor to implement a brand personality perception gap assessment engine. The method comprises receiving, by the brand personality perception gap assessment engine, an inferred brand personality for a specified brand. The method further comprises receiving, by the brand personality perception gap assessment engine, an intended brand personality for the specified brand. The method also comprises calculating, by the brand personality perception gap assessment engine, at least one gap between the inferred brand personality and the intended brand personality. In addition, the method comprises outputting, by the brand personality perception gap assessment engine, an output indicating aspects of the at least one gap.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram illustrating brand personality trait groupings and corresponding top brands for the various traits;

FIG. 4B is an example diagram illustrating a portion of regression results, using a trained brand personality model and brand personality predictor on an example input brand and input crowdsource information;

DETAILED DESCRIPTION

Figure 2:
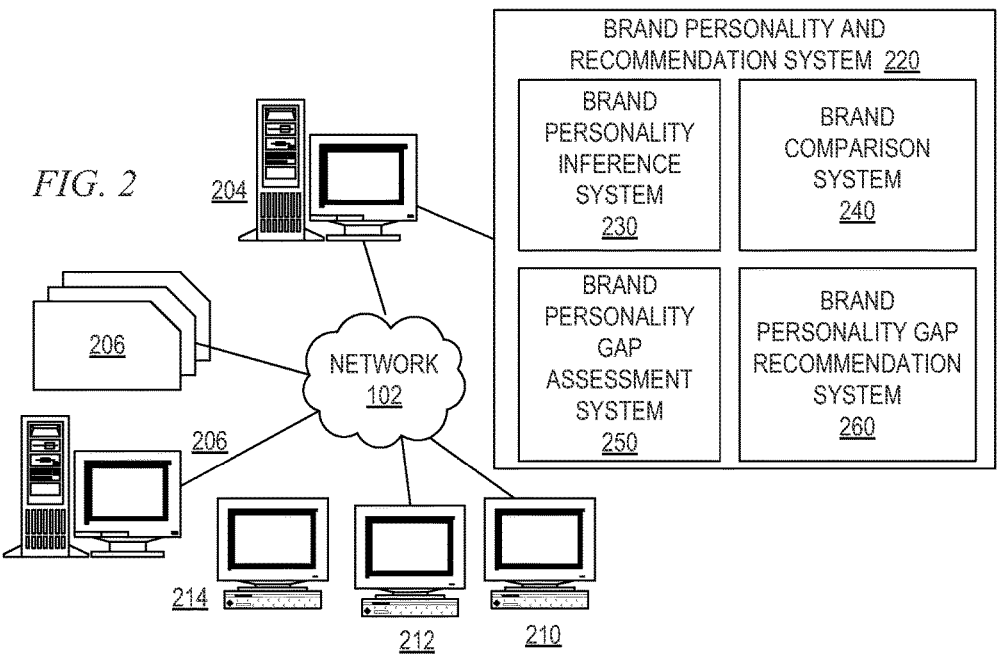
FIG. 2 is an example diagram of a distributed data processing system in which aspects of the illustrative embodiments may be implemented.

The illustrative embodiments provide mechanisms for performing brand personality inference analysis and mechanisms for generating recommendations as to actions to be performed to achieve a desired brand personality perception based on the brand personality analysis. Moreover, the mechanisms of the illustrative embodiments provide a brand comparison engine that identifies gaps between brands as well as potential competitors/partners based on identified overlap in social networking connections of users of the brands. Because the mechanisms of the illustrative embodiments are directed to the analysis of brand personality and the use of brand personality as a way to direct actions to be performed, it is important to first have an understanding of brand personality and how brand personality is evaluated and measured. Thus, the following description will begin with an introduction to the concepts of brand personality and mechanisms for measuring and evaluating brand personality, followed by a description of the operational elements of the illustrative embodiments that operate to analyze brand personality and generate recommendations and/or perform actions, based on the analyzed brand personality.

The mechanisms of the illustrative embodiments recognize that social media provides a tremendous opportunity to shape the perceived personality of a brand. Despite a large amount of research efforts in conceptualizing brand personality and its contributing factors, little is known about the relationship between brand personality and social media. The mechanisms of the illustrative embodiments analyze how brand personality associates with contributing factors manifested in social media. In some illustrative embodiments, based on the analysis of thousands of survey responses and a large corpus of social media data regarding hundreds of brands, importance factors contributing to brand personality are quantified to generate a brand personality model developed based on social media data. This brand personality model is utilized to analyze brands, determine divergent brand personalities from intended or desired brand personalities, generate recommendations for achieving the intended or desired brand personalities, and initiate, in some cases, the performance of actions to achieve the intended or desired brand personalities. These mechanisms of the illustrative embodiments will be described in greater detail hereafter.

Brand Personality

Initially, it should be noted that the term "brand" refers to any designation of a product, service, location, or any other designation of an entity. Brands are often represented by trademarks, service marks, trade dress, or other identifier of a good, service, or source of goods/services. In general, the term "brand" will be used in the present description to refer to any designator of an entity to which people attribute human personality traits.

As noted above, a brand has a personality because people tend to associate human attributes with brands. Brands are often socially significant to groups of people such that people equate various emotions and/or human attributes to the brands which in turn elicits those emotions and/or attributes in the persons consuming the entities associated with the brands. For example, products associated with brands are often consumed in a social setting where a brand's personality creates brand differences and satisfies customers' self-expression needs. Consider red wine, for example. Few customers can distinguish taste differences between various red wines. However, wine brands have different personalities and, when served in a social setting, can make a powerful statement about those who drink them. Moreover, a person's view of the brand's personality can affect the physiological and/or psychological reaction a person has to the product associated with the brand, e.g., the wine may taste better to the person because it is associated with brand A while another wine associated with brand B may be less pleasing.

A great number of theoretical and empirical studies have been carried out to measure brand personality and identify its contributing factors. Researchers initially relied on qualitative methods, such as photo-sorts, free associations, and psycho-dramatic exercises. However, these open-ended techniques are often abandoned in the later stages of research as marketers look for more quantitative ways to detect and enumerate differences among their brands. Also, researchers attempted to use human personality scales developed in psychology to directly measure brand personality. However, these scales are not adequate and powerful enough to describe the personality of a brand.

The largest research stream focuses on the validation of various brand personality dimensions. The most known brand personality measure was developed in 1997 by J. L. Aaker and documented in "Dimensions of Brand Personality," Journal of Marketing Research, 34, 1997, pp. 347-356. As described by Aaker, the brand personality scale is comprised of 42 traits grouped into five large dimensions: sincerity, excitement, competence, sophistication, and ruggedness. Brand personality scales have been demonstrated to be a reliable, valid, and generalizable scale for assessing brand personality. Since 1997 most marketing literature has adopted a Likert scale survey approach based on the Aaker scale to assess brand personality. FIG. 1 illustrates an example table of a portion of the five large dimensions and their corresponding traits along with names of the top 5 brands associated with the corresponding trait and descriptive statistics, as may be determined from a Likert scale survey.

Another category of research into brand personalities examines the factors affecting perceived brand personality. For example, there may be three main factors that influence and form brand personality, e.g., User Imagery, Employee Imagery, and Marketing Message, also referred to herein as "principle driving factors". User Imagery and Employee Imagery are the set of human characteristics associated with typical users and employees of the brand. Based on stereotyping theory, customers may develop generalized beliefs about groups of users/employees in which all individuals from one group are regarding as having the same set of leading characteristics. Customer's beliefs about users and employees may affect their perceptions of the corresponding brand. Marketing message refers to marketing messages which are designed specifically to make consumers aware of a brand and develop a positive attitude towards the brand. Marketing messages are often distributed to consumers through a variety of media channels such as social media, television, radio, and the like. User Imagery, in theory, is considered to be the primary factor driving brand personality.

Surveys are generally used to obtain information about user/customer perception of a brand. However, an inherent limitation of survey-based approaches for determining brand personality is the flexibility of a survey. Conducting a survey is often a time-consuming and labor-intensive process and thus, it becomes expensive to assess brand personality frequently. On the other hand, it has been determined that brand personality actually does change frequently, especially as new marketing messages are generated and broadcast, new products and services are released, and the like, leading to a need to actually evaluate brand personality on a more frequent basis. That is, while it has been determined that human personality exhibits temporal consistency, i.e. human personalities do not change over time, brand personality does not exhibit the same temporal consistency and thus, human personality scales developed in psychological studies and utilized in such surveys are inadequate to describe the personality of a brand. Furthermore, survey based approaches suffer non-response and sampling related deficits. In addition, survey based approaches can suffer from administrator bias in that the person administering the survey or creating the survey may intentionally or unintentionally introduce bias into the survey questions themselves.

Moreover, implementing an intended brand personality is a challenging endeavor for any brand owner. In practice, brand managers often have an intended brand personality that they wish to achieve through marketing efforts and devote extensive resources to these marketing activities to try to achieve these brand personalities. However, these marketing activities often fail to ensure consumers perceive the brand in the way they intended. There may be many theoretical strategies for implementing an intended brand personality, but these strategies are often general and do not consider the specific context of the brand. There are no computational approaches or systems to assist brand managers in determining actions to be taken to maximize the probability that an intended brand personality will be achieved.

Overview

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
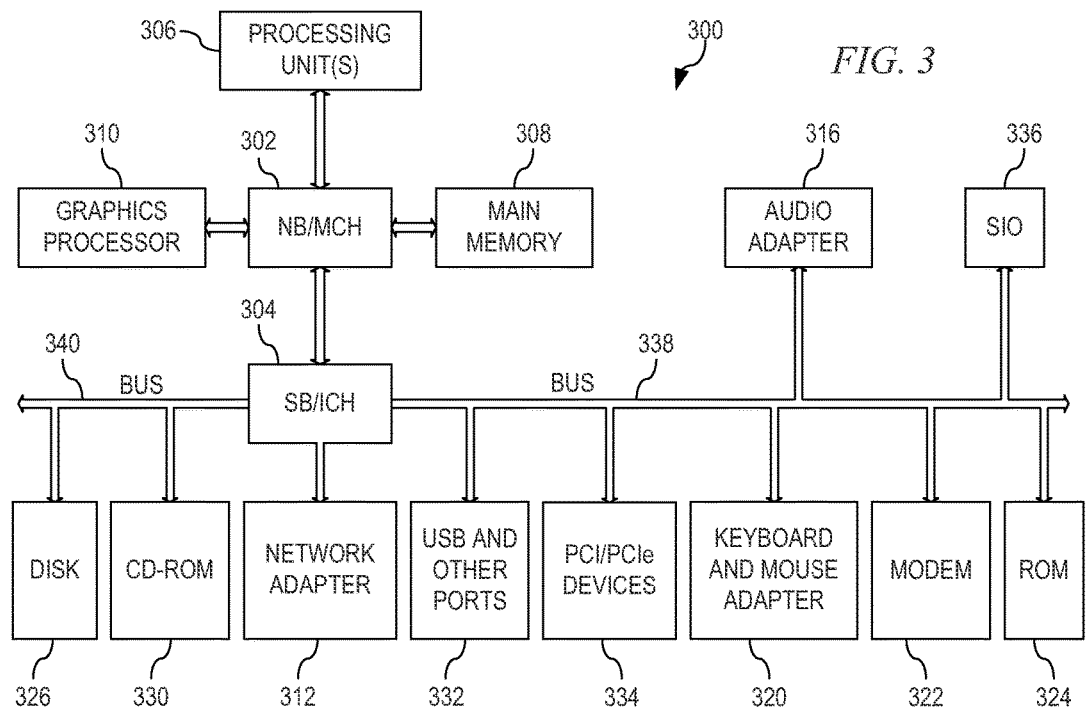
FIG. 3 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

As shown in FIG. 2, one or more of the computing devices, e.g., server 204, may be specifically configured to implement a brand personality assessment and recommendation system 220. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates brand personality assessment and the generation of recommendations for performing actions to improve the perception of brand personality by closing the gap between the perceived brand personality and the intended brand personality of the brand owner. In some illustrative embodiments, the brand personality and recommendation system 220 may further interface with other computing devices to initiate operations to perform the recommended actions so as to improve brand personality perception and close the gap.

It should be appreciated that the mechanisms of the illustrative embodiments interface with crowdsource computing systems, such as may be provided by other servers 206, one or more client computing devices 210-214, or the like, to obtain the necessary information upon which to assess the brand personality and utilize the assessment to generate recommendations and perform actions. These crowdsourcing computing systems may take many different forms including social networking websites hosted by one or more computing devices, news groups, blogs, crowdsourced databases or knowledge bases, or any other source of information authored or originating from multiple users, sources, or any other type of provider of crowdsource information. The crowdsource computing systems are used to infer brand personality scales for brands as well as identify new brand personality traits to be tracked both with the particular brand analyzed and future brands.

The brand personality and recommendation system 220 infers the personality of a brand from the perspective of multiple constituents (e.g., users, customers, or the like) that are members of the crowdsourcing computing system, and combines these perspectives into feedback regarding the brand's personality ultimately generating brand personality scale (BPS), qualitative explanations of the inferred BPS, and newly identified traits to be utilized in evaluating the BPS and future BPS of other brands. The brand personality and recommendation system 220 may perform such assessments of brand personality based on crowdsourcing computing system information as an input for a plurality of brands and compare the resulting BPS generated for each of the brands to determined similarities and differences in brand personality. In addition, analysis is performed to determine overlap of crowdsourcing sources with regard to the compared brands to calculate group metrics. A visual analytic output may be generated to visualize the relationships between brands and their corresponding brand personalities including identification of competitors, potential partners, and the like.

The brand personality and recommendation system 220 further operates to identify brand personality perception gaps between the assessed brand personality and an intended or desired brand personality. That is, the brand personality and recommendation system 220 may be provided with an intended brand personality scale (BPS) for a particular brand. The mechanisms of the brand personality and recommendation system 220 may assess the brand personality using crowdsourcing computing systems as discussed previously, or otherwise be provided with perceived brand personality scale (BPS) generated from analysis of recent and/or historical data. The brand personality and recommendation system 220 compares the intended and assessed BPS to determine gaps between the intended and perceived brand personalities. Moreover, the brand personality and recommendation system 220 may assess the temporal changes of perceived personality over time and provide an output indicative of the determined gaps and temporal changes of intended and perceived brand personality.

Furthermore, the brand personality and recommendation system 220 may further operate to provide recommendations and initiate operations for bridging the brand personality perception gaps identified by the brand personality and recommendation system 220. That is, given the brand personality gaps determined as mentioned above, a severity of the brand personality perception gaps is calculated and possible factors associated with these gaps are identified. The identification of the factors associated with the gaps may comprise the execution of simulations using predictive models that predict brand personality assessments for changes in crowdsourcing input data and determining the amount of change exhibited. Solutions for bridging the perception gaps are then determined based on the amount of change achieved to more closely approach the intended or desired brand personality scale. The solutions may be ranked based on the severity of the gaps, the relevance of factors associated with the gaps, the brand's relationship with other brands, and the like. These solutions are associated with actions that brand managers can execute to modify the perceived brand personality. Multiple solutions may also be combined together to form a composite solution that the brand manager may undertake. In some embodiments, automatic initiation of operations to implement actions associated with recommended solutions may be performed.

Thus, as shown in FIG. 2, the brand personality and recommendation system 220 comprises a brand personality inference system 230, a brand comparison system 240, a brand personality perception gap assessment system 250, and a brand personality perception gap recommendation system 260. The brand personality inference system 230 comprises logic to perform operations, as described in more detail hereafter, for assessing and inferring the brand personality scale (BPS) of a particular brand from various multi-modal sources, such as text, audio, and video, generated by multiple constituents of a brand, such as provided via one or more crowdsourcing systems, e.g., constituents may be employees of the owner of the brand, users of the brand, endorsers of the brand, analysts, of other stakeholder in the brand. The term "stakeholder" as it is used herein is anyone that has a vested interest in the brand and its perception by users/customers.

The brand comparison system 240 comprises logic to perform operations, as described in more detail hereafter, for comparing the brand personalities of a given brand with other brands, preferably of a similar nature, and provide interactive analysis on the similarities and differences in brand personality as well as identification of potential competitors and partners. The brand personality perception gap assessment system 250 comprises logic to perform operations, as described in more detail hereafter, for automatically identifying the perception gaps between an intended brand personality and the assessed perceived brand personality at an aggregate level and at a constituent level. The brand personality perception gap recommendation system 260 comprises logic to perform operations, as described hereafter, to automatically evaluate the brand personality perception gaps, perform simulation using personality models to identify contributing factors, determine recommended actions to bridge the personality perception gaps based on the results of the simulation, and in some cases initiate actions to bridge the personality perception gaps.

As noted above, the mechanisms of the illustrative embodiments utilize specifically configured computing devices, or data processing systems, to perform the operations for brand personality assessment and action recommendation. These computing devices, or data processing systems, may comprise various hardware elements which are specifically configured, either through hardware configuration, software configuration, or a combination of hardware and software configuration, to implement one or more of the systems/subsystems described herein. FIG. 3 is a block diagram of just one example data processing system in which aspects of the illustrative embodiments may be implemented. Data processing system 300 is an example of a computer, such as server 204 in FIG. 2, in which computer usable code or instructions implementing the processes and aspects of the illustrative embodiments of the present invention may be located and/or executed so as to achieve the operation, output, and external affects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described hereafter with regard to the brand personality assessment, comparison, brand personality perception gap assessment, and brand personality perception gap recommendation and action initiation.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

As noted above, the illustrative embodiments provide a mechanism for assessing brand personality for various brands, comparing brand personalities, identifying brand personality perception gaps, and determining recommendations for bridging the brand personality perception gaps as well as initiating actions to implement such recommendations. Each of these functions or operations may be provided in separate systems or subsystems, hosted on the same or different computing devices, such as those described above with regard to FIGS. 2-3. These systems, or subsystems, may be integrated into a single overall system or may be separate and operate independent of one another. That is, in some illustrative embodiments, one system or subsystem provides input to the next such that all of the systems/subsystems work together as a whole. In other illustrative embodiments, each system/subsystem may work independent of the others so long as the proper input is provided, regardless of the particular source from which that input is received, i.e. whether it be from another system/subsystem described herein or another source that provides the same type of input. Thus, the following description will set forth the separate systems/subsystems of the illustrative embodiments in separate sections, however this is not to be construed that the separate systems/subsystems must be implemented separately or together. Any implementation of any one of these, or a combination of two or more of these, systems/subsystems is intended to be within the spirit and scope of the present invention.

Brand Personality Inference System

Figure 4A:
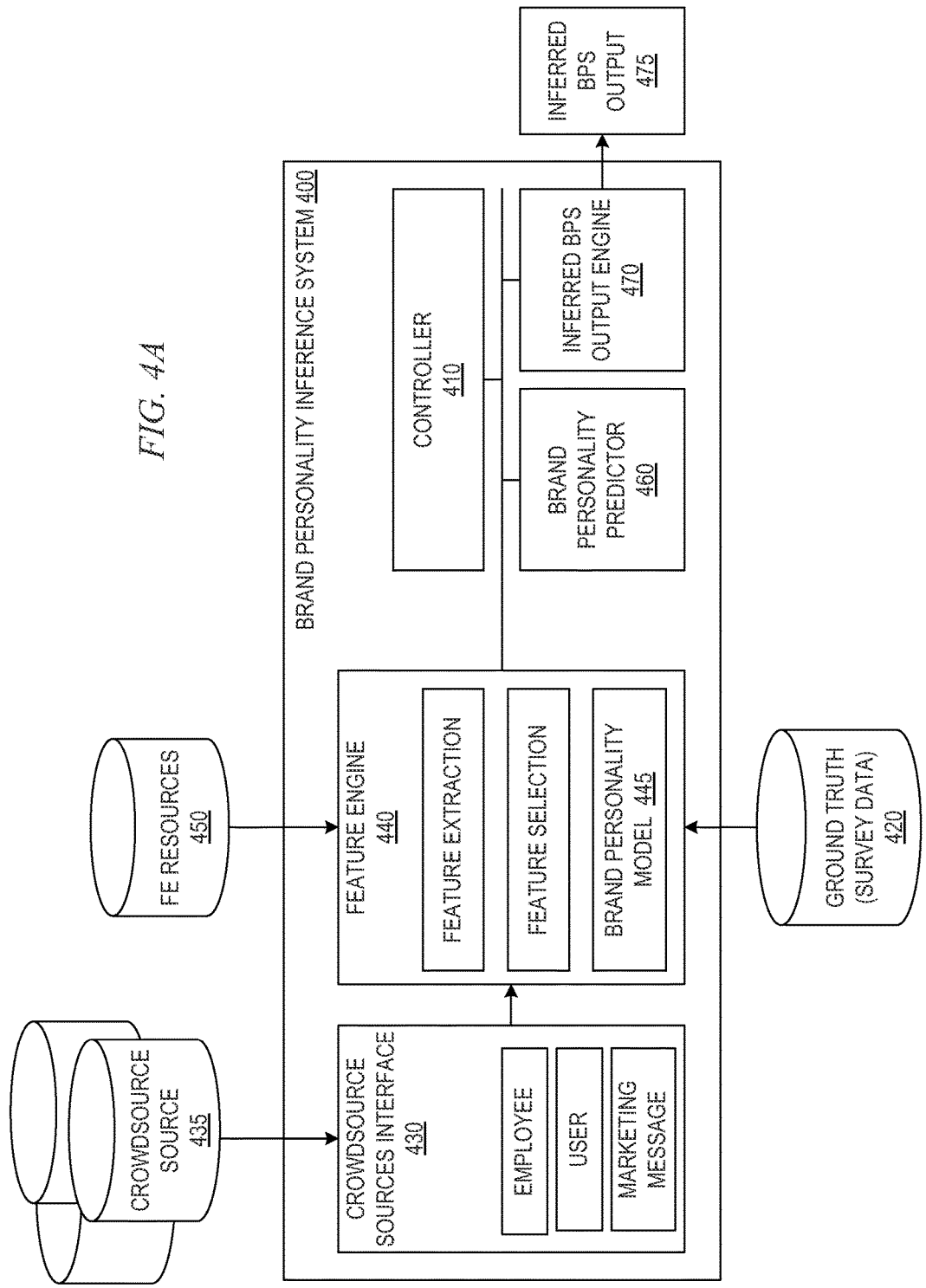
FIG. 4A is an example diagram of a brand personality inference system in accordance with one illustrative embodiment.

One aspect of some illustrative embodiments of the present invention is the ability to assess the brand personality of a given brand based on an evaluation of crowdsource information so as to generate inferred brand personality scales that indicate the perceived brand personality traits of a brand. FIG. 4A is an example diagram of a brand personality inference system for performing such operations in accordance with one illustrative embodiment. The brand personality inference system 400 in FIG. 4A may be one example of a brand personality inference system such as system 130 in FIG. 1.

As shown in FIG. 4A, the brand personality inference system 400 comprises a controller 410, ground truth data source 420, crowdsource sources interface 430, a feature engine 440, feature extraction resources 450, brand personality predictor 460, and inferred brand personality scales output engine 470. The controller 410 controls the overall operation of the brand personality inference system 400 and orchestrates the operation of the other elements of the system 400. Operations not specifically attributed to other elements in FIG. 4A are performed by the controller 410.

The feature engine 440 receives, as input, ground truth data structures 420, crowdsource brand personality information from crowdsource sources 435 via the crowdsource sources interface 430, and feature extraction knowledge resources 450. Each of these types of input are described in greater detail hereafter. Based on the inputs received, the feature engine 440 identifies features for brand personality modeling by leveraging brand personality theories relating to the relationships between perceptions of different personality traits of brands from various consumers of brands. That is, one or more brand personality models 445 are developed through machine learning processes based on natural language processing of natural language crowdsource information to extract features that are indicative of brand personality traits and learning the relationships between these features and these traits so as to generate a predictive model 445 that, when analyzing future natural language crowdsource information regarding a brand, the predictive model 445 is able to predict or infer the brand personality traits that groups of individuals are likely to attribute to the brand.

In some illustrative embodiment, the brand personality models 445 comprise a separate model for each of a plurality of traits specified in a Brand Personality Scale (BPS), such as the 42 personality traits in the Aaker BPS, such that each model has a single dependent variable, i.e., the personality trait, and determines a measure of that personality trait based on the crowdsource information processed for a brand. In some illustrative embodiments, the individual brand personality models 445 for each of the personality traits are separate Lasso regression models as described hereafter. A collection of results of each of the models is used to generate the predicted or inferred BPS for the brand. In another illustrative embodiment, a single model 445 may be utilized that models multiple brand personality traits. For example, a multivariate regression technique may be utilized in which one regression model, having multipole dependent variables, i.e. multiple personality traits, is used.

The ground truth data structure 420 that is received by the feature engine 440 provides a baseline for brand personality modeling in that it provides a basis by which training of the brand personality model(s) 445 is performed. In some illustrative embodiments, the ground truth data structures 420 are compiled from data collected as part of the conducting of one or more surveys of persons with regard to brand personality traits and particular brands. The surveys may be administered via computer systems and electronic survey mechanisms that pose questions to users and elicit feedback responses from the users. The surveys may have, for each question, pre-defined potential answers that are selectable by the user, free-form fields in which the user is free to enter any textual response that the user wishes to provide, or the like. With regard to the pre-defined potential answers to the various questions, the data for the selected answers may be compiled in a straight-forward manner. With regard to free-form fields, the text entered by the user may be subjected to natural language textual analysis or the like to extract features indicative of the answer which may then be utilized to compile data indicative of the answers to the various questions associated with the free-form fields.

In one illustrative embodiment, users that are participants in the survey are presented with a standardized electronic questionnaire that is directed to their perceptions of a brand. The participants rate how descriptive the various personality traits of a brand personality scale (BPS) are of the brand in question, e.g., using the Aaker BPS, the participant rates the 42 traits of the Aaker BPS with regard to how well they believe the traits are descriptive of, or are associated with, the particular brand. Various ranges of scoring with regard to each of the traits may be provided, e.g., a 0 to 7 scale with 7 being maximally descriptive and 0 being not descriptive of the brand. The traits may be arranged in random order to control order effects. Duplicative questions may be included to filter low quality responses.

In this way, quantitative ratings of various traits in a selected BPS may be collected for the brand from each of a plurality of users. Moreover, each user, or survey participant, may complete a survey for each of a plurality of brands. Thus, a plurality of brands have associated user provided feedback data regarding how relevant or descriptive of the brands the users believe the various traits of a BPS are. This data may be aggregated and statistical analysis performed on the quantitative ratings to generate an aggregate baseline or ground truth BPS for each of the brands. The crowdsource information from the crowdsource sources, as described hereafter, may be used as a basis for generating a brand personality model which may then be used to generate an inferred BPS which is compared to the ground truth 420 to determine how well the brand personality model generates results matching the ground truth 420. Based on differences between the model's results and the ground truth 420, adjustments may be made to the brand personality model to cause it to generate more accurate results more closely matching the ground truth 420, e.g., modifying weight values within the model, or the like.

The ground truth 420 may be used for feature selection and brand personality model 445 training. For example, a decision tree may be established for feature selection and the ground truth 420 may be input along with raw features extracted from the crowdsource information via the crowdsource interface 430. Ground truth 420 may be used to train the decision tree mechanism to determine which features are more important for evaluation of particular brand personality traits. For example, a feature located in the upper level of nodes in the decision tree, e.g., top 3 levels, can be used as relevant features for brand personality modeling, such as in brand personality model 445. Thus, crowdsource information and the ground truth 420 may be used together to select relevant features that are used to train the brand personality model 445 so as to provide an improved training of the brand personality model 445.

As discussed above, the ground truth data structures 420 may be obtained from a survey system 425 which administers the surveys electronically to participants and collects the participant inputs with regard to brand personality traits and then aggregates this data and performs statistical analysis to generate one or more ground truth data structures 420 for one or more brands. The ground truth data structures 420 may be a baseline BPS for the brand in question, for example. In one illustrative embodiment, the baseline BPS of the ground truth data structures 420 for a particular brand is generated by averaging the ratings that participants gave for each of the traits of the BPS in the administered questionnaire of the survey so that the baseline BPS comprises the average ratings, on the established range of ratings, for each trait in the BPS.

As shown in FIG. 4A, in addition to the ground truth data structures 420, the feature engine 440 also receives crowdsource information from one or more crowdsource sources 435 via the crowdsource system interface 430. The crowdsource information may be obtained from accounts (e.g., user accounts, organization accounts, or the like) associated with the brand on social networking websites, business networking websites, a brand owner's own computing systems, trade publication source database or computing system, or any other corpus of natural language information that may be analyzed using natural language processing techniques to extract information indicative of the perception of the brand amongst one or more groups of people. Examples of such crowdsource information include instant messages, text postings to social or business networking websites, articles in journals, electronic mail messages, webpage content, or the like.

This crowdsource information may also comprise multimodal behavior data, e.g., audio, video, textual, graphical, or the like, representing user contributions to a networking (social, business, governmental, or other) system which are indicative of the online behavior (content contributions) of users categorized into different groups of consumers of a brand. The categorization of users into the different groups of consumers may be performed in accordance with the particular crowdsource source, for example. That is, if the information is being obtained from a general social networking website, then the crowdsource information obtained from that website may be categorized as coming from general users or general customers of the brand, i.e. customer behavior data. If the information is being obtained from a crowdsource source that is specific to current employees or former employees of the owner of the brand, then the information obtained may be categorized as employee behavior data. If the information is being obtained from a crowdsource source that is associated with marketing messages generated by the owner of the brand or its affiliates, then the information obtained may be categorized as marketing message behavior data or other stakeholder behavior data.

Various categorizations of crowdsource information may be utilized without departing from the spirit and scope of the illustrative embodiments. The categorization of crowdsource information may be utilized to evaluate the information differently based on the categorization when generating a brand prediction model, e.g., generating different weights values for functions of the brand personality model(s) 445, generating different functional relationships in the model 445, or the like, as described hereafter. For example, the sources of crowdsource information, or even individual users that submitted the crowdsource information that is then provided by the source, may be weighted according to inferences generated by computing the relationship between a user's textual data submitted as their contribution of crowdsource information and weights associated with keywords corresponding to a personality trait, where the weights associated with keywords may be trained in the brand personality model 460.

The crowdsource information, in some illustrative embodiments, is categorized into three main categories corresponding to the three principle driving factors of brand personality, i.e. employee imagery information, user imagery information, and marketing message imagery information. Of course other categories of information may also be obtained, such as other stakeholder behavior information and the like, for example, without departing from the spirit and scope of the present invention. The crowdsource source interface 430 may be configured to communicate with the various crowdsource sources 435 and may be configured to categorize the information retrieved from these crowdsource sources 435 into the categories previously defined for the particular crowdsource sources 435. Thus, for example, if it is previously determined that information obtained from a Facebook™ social networking webpage associated with a brand is to be categorized as a "user imagery" category of crowdsource information, then the information gathered from the Facebook™ social networking webpage will be stored in a data structure associated with this category of crowdsource information, or otherwise associated with this category of crowdsource information.

It should be appreciated that this information may be provided in many different modes including audible, textual, and video/graphical modes and may be provided in an unfiltered format. That is, the information may be obtained by the feature engine 440 and processed by the feature engine 440 to process the information in accordance with the particular mode of the information, and extract features indicative of brands and the primary factors contributing to brand personality as well as the traits of the brand personality scale itself, as discussed in greater detail hereafter.

Using the three principle driving factors discussed above, the employee imagery information comprises behavior data collected from crowdsource sources that are associated with current/former employees of the owner of a brand or affiliate of the owner of the brand. These sources may include websites and other social networking systems where current and former employees can submit their reviews about the owner of the brand, the brand itself, and other information indicative of employee imagery of the brand. Often times, such submissions from current/former employees may include statements about working conditions, company culture, management style, and the like. Such information may be captured to generate a representation of the employee imagery driving factor of brand personality. One example of a crowdsourcing source that provides employee imagery category information is the website Glassdoor.com which provides a social media platform where current and former employees can post reviews about their employers.

With regard to user imagery information, this information entails any behavior data that is associated with customers, consumers, or other users that comment on a particular brand and which are not current/former employees of the brand owner or its affiliates, as would be encompassed by the employee imagery information. That is, social networking and other online source of information that are directed to the opinions and viewpoints of users with regard to brands may be included under this category of crowdsource information. For example, a brand's Twitter™ or Facebook™ account, or other social networking website account, often has followers, friends, or the like. These followers are likely to be using and/or liking the particular brand in question. The set of brand followers may be considered as contributing crowdsource information that is categorized as user imagery information. In some illustrative embodiments, in order to filter out illegitimate user accounts on such crowdsourcing sources from legitimate user accounts, only user accounts that have a description of the user within the user account may be used as a source of user imagery information since illegitimate user accounts tend to not have any such user descriptions. Thus, a filtering of the sources may be performed by the crowdsource sources interface 430 prior to providing the crowdsource information to the feature engine 440.

The marketing message imagery information may be obtained from similar sources to that of the user imagery information and/or employee imager information, but is specifically associated with marketing messages made by the owner of the brand or its affiliates. For example, a company's Twitter™ account allows the company to push intended information to the public. Such notifications, or "tweets," from the company, owner of the brand, or its affiliates, are considered marketing messages. The marketing message itself, and the reactions and responses to these marketing messages that are posted in response to the tweet, may be considered as providing crowdsource information categorized as marketing message imagery.

The crowdsource information received from the crowdsource sources 435 via the crowdsource source interface 430 is processed by the feature engine 440 using natural language processing, image analysis, audible feature analysis, or any other content analysis mechanism to perform feature extraction, selection, and new feature construction. A "feature" in this context is any element of crowdsource information that is indicative of a principle factor of brand personality, e.g., user imagery, employee imagery, and marketing message factors. These features may be audible features, textual features, or video/graphical features. For ease of explanation, it will be assumed that the crowdsource information received is in a textual mode and that the "features" extracted, selected, and constructed are textual features, e.g., key terms, phrases, topics, and the like, which are extracted using natural language processing techniques to analyze the natural language text with regard to both semantic and syntactic features.

The feature engine 440 utilizes feature extraction resources 450 to assist with the feature extraction aspects of its operation when processing the crowdsource information. The feature extraction resources 450 provide the resource data for identifying known indicators of the principle factors of brand personality, e.g., specific key terms, phrases, topics, patterns of video/graphical image data, and the like. In some illustrative embodiments, the feature extraction resources 450 comprise keyword/key phrase dictionaries, synonym dictionaries, and/or any other natural language processing based linguistic and semantic resources used to perform natural language processing on textual input of the crowdsource information. In one illustrative embodiment, a Linguistic Inquiry and Word Count (LIWC) dictionary may be established for each of a plurality of LIWC categories, e.g., the categories generally grouped into the groups Linguistic Processes, Psychological Processes, Personal Concerns, and Spoken Categories, that are used to measure various ones of the brand personality traits of a selected brand personality scale (BPS), e.g., the 42 Aaker brand personality traits mentioned previously.

In some illustrative embodiments, the LIWC categories correspond to linguistic and psychological features that may be related to brand personality traits. Thus, individual LIWC categories, or combinations of LIWC categories, may be mapped to the various traits of the particular BPS being utilized, such as by way of a establishing a mapping data structure. As a result, the calculations and evaluations with regard to these LIWC categories may be similarly mapped to these traits as well. For example, it may be determined, through machine learning and training of the brand personality model(s) 445 using the ground truth 420, that a particular brand personality trait corresponds to a particular subset of categories of the LIWC and thus, the corresponding dictionaries for those categories may be associated with the brand personality trait. In this way, those terms/phrases in the corresponding dictionaries may be used as a basis for evaluating crowdsource information to determine occurrences of those terms/phrases and utilize the occurrences to measure a degree of the brand personality trait being associated with a particular brand.

The feature extraction operation of the feature engine 440 may operate to extract instances of matching key words, phrases, and the like, matching the terms/phrases in the associated dictionaries corresponding to the brand personality model 445 for the particular brand personality traits being evaluated, from the crowdsource information and maintain metrics associated with the various LIWC categories and/or brand personality traits. Thus, each textual statement received in the crowdsource information may be processed by the feature engine 440 with regard to each of the keyword dictionaries for each of the LIWC categories to evaluate the statements against the LIWC categories and generate counts of instances of keywords in the keyword dictionary for the particular LIWC category.

Statistical analysis may be applied to the collected counts of instances of keywords for each of the LIWC categories to generate a plurality of statistical descriptors. In one illustrative embodiment, 60 LIWC categories are utilized with 7 statistical descriptors for each of the 60 LIWC categories: mean, $5^{th}$ to $95^{th}$ percentile, variance, skew, kurtosis, minimum, and maximum. These statistical descriptors indicate for each LIWC categories, the most predictive keywords corresponding to the LIWC category and the degree or confidence of the occurrence of these keywords being predictive of the corresponding LIWC category. Thus, a combination of the LIWC categories and statistical descriptors may be utilized for each of the principle driving factors of brand personality, e.g., user imagery, employee imagery, and marketing messages, to devise a brand personality model 445 for modeling brand personality. For example, assuming 60 LIWC categories, 7 statistical descriptors, and 3 principle driving factors, the brand personality model 435 may comprise 1,260 predictive variables which may be evaluated for each brand.

Feature selection operations may be performed on these predictive variables to select variables that are most representative of the each of the BPS traits. The BPS traits are regarded as dependent variables that are dependent upon these predictive variables in accordance with the established mapping data structures or functions that map the selected predictive variables to the BPS traits. The selection operation may be performed using, for example, a regression analysis, such as a Least Absolute Shrinkage and Selection Operator (LASSO) regularized regression analysis or other machine learning methodology. With a LASSO regularized regression, the selection operation seeks a sparse solution by shrinking the regression coefficients of weak and/or correlated predictors to zero such that the LASSO regression can select a set of best explanatory predictive variables.

Moreover, following a standard feature selection procedure, 10-fold cross validation methodology may be used to select the most reliable predictors and thus, increase the confidence level of selected features, e.g., the coefficient of determination ($R^2$) value as described hereafter. In one illustrative embodiment, the behavior data is divided into 10 subsets, one subset of the data is used as a test set and the remaining 9 subsets are used as training data sets. This generates 10 models and each model may select different predictors (predictive variables) due to different training sets. To ensure reliability of results, only predictors that were consistently selected in all of the models may be utilized in the final brand personality model that is used for inferring brand personality scales.

The confidence level of the selected features is determined, in one illustrative embodiment, by calculating a coefficient of determination $R^2$ of the results of the linear regression or LASSO regularized regression. The $R^2$ value is computed by systematically removing each subset, in the 10-fold cross validation, from the 10 subsets of the data set, estimating the regression equation, and determining how well the model predicts the removed subset. The calculated $R^2$ can avoid overfitting the brand personality model and can be more useful than adjusted $R^2$ for comparing models because it is calculated using observations nod included in model estimation. Larger values of the computed $R^2$ value suggest a model has greater predictive ability, i.e. has a higher confidence. A $R^2$ value may be calculated for each of the traits of the BPS, i.e. the dependent variables. If the confidence measure, e.g., the $R^2$ value, meets or exceeds a predetermined threshold confidence or $R^2$ value, then the corresponding brand personality model is considered to be sufficiently accurate for predicting brand personality and may be output for use during runtime operations to predict or infer brand personality for brands of interest based on ground truth and crowdsource information for the brands of interest.

It should be appreciated that the crowdsource information used by the feature engine 440 may come from various types of consumers including employees, customers, and other stakeholders. The feature extraction and selection is performed across all of these consumers so that the features that are extracted and selected for inclusion in the final brand personality model are the ones that are most representative of the brand personality as they are more commonly used by various consumers.

The final brand personality model, or models, 445 is/are implemented in a brand personality predictor 460 during runtime operation. That is, the feature engine 440 may receive crowdsource information for a brand of interest from the crowdsource sources 435 via the interface 430 and may perform operations to extract features from the crowdsource information in the manner previously described above. Features may be selected as those that are most representative of the brand from the viewpoint of the crowdsource information and input to the brand personality predictor 460 which applies the final brand personality model(s) 445 to the set of selected features to determine the brand personality scale (BPS) values for the various traits of the BPS based on the configured final brand personality model.

FIG. 4B is an example diagram illustrating a portion of regression results, using a trained brand personality model 445 and brand personality predictor 460 on an example input brand and input crowdsource information. The brand personality predictor 460 utilizing the trained brand personality model 445 uses the three principle driving factors of user imagery, employee imagery, and marketing messages to determine predicted values for the various brand personality traits of the brand personality scale. The predicted $R^2$ values are reported with regard to each of the personality traits with the predictive variables and their standardized beta coefficients being shown in the subsequent columns in FIG. 4B for each of the three principle driving factors.

The predicted, or inferred, brand personality scale (BPS) trait values may be output along with a qualitative explanation of the predicted or inferred BPS trait values as the inferred brand personality scales 475 by the inferred BPS output engine 470. Computational techniques are combined with crowdsourcing techniques to generate qualitative explanations of the inferred BPS trait values. For example, domain heuristics/rules may be utilized to programmatically identify representative users of a brand on social networks. Then, based on the inferred BPS, the system prompts these users to explain their perceptions of a brand related to certain traits. These responses are aggregated to explain the inferred BPS trait values. Alternatively, a user's previously submitted content, e.g., posts, instant messages, etc., that reference the brand or otherwise are indicative of the user's perception of the brand may be used as a basis for generating the qualitative explanations. In some illustrative embodiments, the personality traits of the users themselves may be used as the basis for the qualitative explanation.

For example, the crowdsource information may comprise a plurality of natural language textual content submitted by a plurality of users. The natural language textual content is tied to the particular users that provided the content via an identifier of the user, which in turn may be associated with a user profile. The user profile may comprise demographics, a description of the user, etc., which together may be indicative of the type of the user. The profile may be analyzed to associate personality traits with the user and these personality traits may be a basis for generating a qualitative explanation based on a commonality of personality traits associated with representative users. Representative users may be selected as a subset of the users that provided natural language textual content which have a highest number of matching terms/phrases or other features mentioned in their submitted natural language textual content with the terms/phrases or other features indicative of the brand personality trait in question, e.g., the top 10 ranked users. Thus, if a number of representative users have a personality trait of conscientiousness, and the brand personality trait in question is trustworthiness, then a qualitative statement as to why the brand has a relatively high trustworthiness brand personality trait value is because the representative users are in general conscientious.

Moreover, natural language text content that has the most relevance to the particular brand personality trait, e.g., the most matches of terms/phrases with those indicative of the brand personality trait, may be selected as representative qualitative explanations. For example, if user A submits an instant message of the type "I love brand A facial tissue because it is soft, durable, and cost effective" and the terms/phrases associated with the brand personality trait in question are "soft,", "durable", "cost", and "facial tissue", then this statement by user A may have a relatively large match and be considered a qualitative explanation as to why the brand personality trait value for the brand personality trait was calculated to be relatively high. In some instances, however, such statements may not be previously provided by the representative users and thus, a request may be sent to the representative users to submit a natural language textual response to explain their rating of the brand personality trait and their response may be used as a basis for the generating the qualitative explanation. Of course, any mechanism for generating a qualitative explanation may be used without departing from the spirit and scope of the illustrative embodiments.

Figure 5:
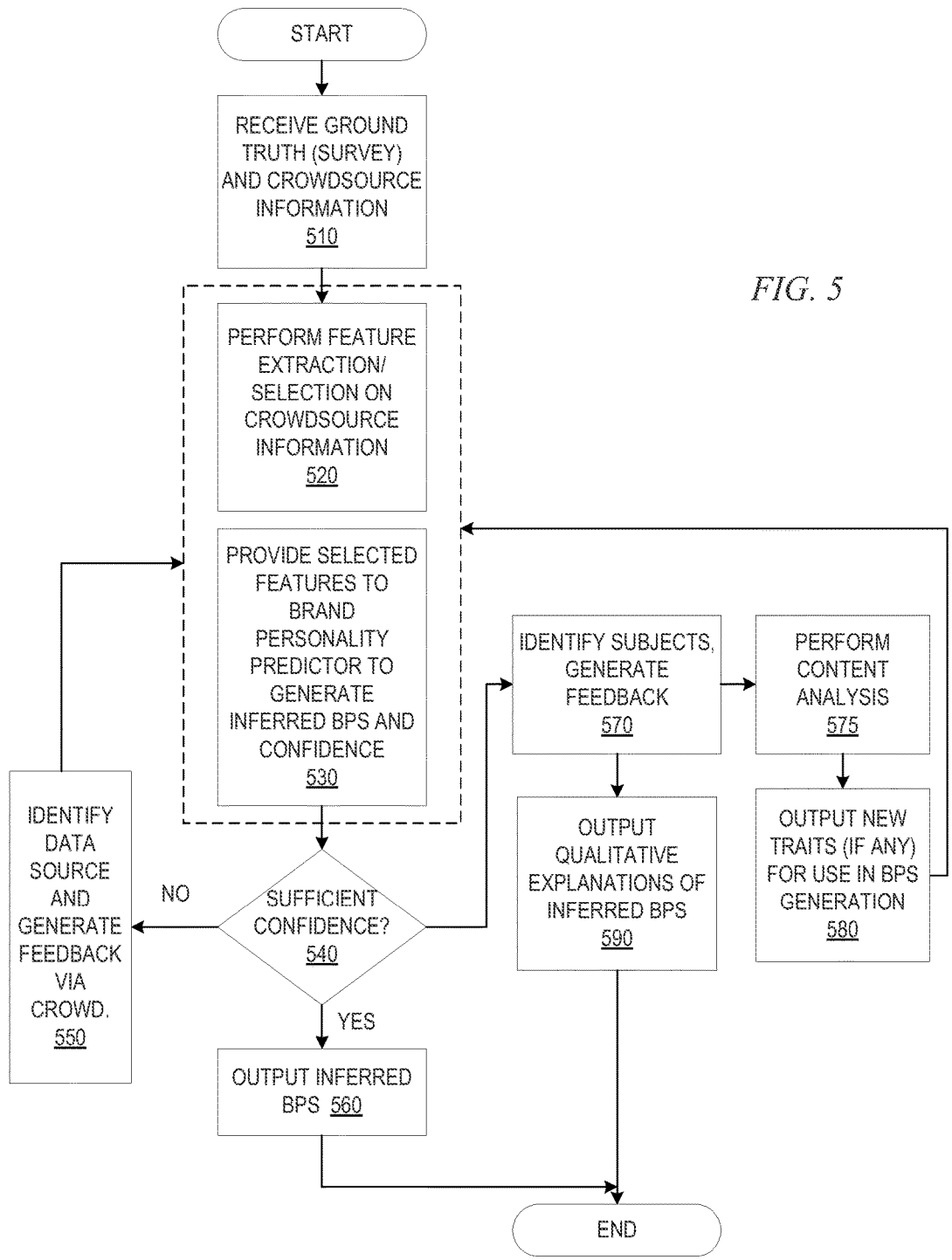
FIG. 5 is a flowchart outlining an example operation for brand personality prediction/inference in accordance with one illustrative embodiment.

FIG. 5 is a flowchart outlining an example operation for brand personality prediction/inference in accordance with one illustrative embodiment. The operation outlined in FIG. 5 may be implemented, for example, by a brand personality assessment systems, such as shown in FIG. 4. It is assumed for purposes of the description of FIG. 5 that a final brand personality model has already been established through the mechanisms described above and the final brand personality model is implemented by a brand personality predictor to predict the brand personality scale (BPS) values for a brand of interest.

As shown in FIG. 5, the operation starts with the receipt, as input, of one or more ground truth data structures and behavior data, i.e. crowdsource information, regarding the brand of interest (step 510). For example, ground truth data structures may be established for the brand and specific crowdsource sources associated with the brand may be contacted to retrieve behavior data, e.g., social networking website accounts associated with the brand, owner of the brand and its affiliates, and the like. This information is input to the feature engine which performs feature extraction and selection operations on the input (step 520) with the selected features being input to the brand personality predictor which generates a prediction, or inference, of the values of the personality traits associated with a BPS and evaluates the confidence of the predicted or inferred values (step 530).

The confidence, e.g., $R^2$ value, associated with the predicted or inferred trait values is checked against a predetermined threshold to determine if the result generated by the brand personality predictor meets a minimum threshold level of confidence (step 540). If the minimum threshold level of confidence is not met, then data sources are identified and feedback is generated via the crowdsourcing sources and provided back to the computational operations in steps 520, 530 to perform new predictions, or inferences of BPS for the brand. That is, within step 550, in one illustrative embodiment, the mechanisms of the illustrative embodiments first assign relative weights to a user/source of crowdsource information on each individual trait. For instance, these weights could be inferred by computing the relationship between a user's textual data from social media and the keyword weights of a personality trait produced in the brand personality predictive model 445. Inferred trait weights of users can be used to identify representative users of the brand for each trait. For example, the mechanisms of an illustrative embodiment may identify a set of brand Twitter™ followers who are highly representative for the personality trait "rugged" of the brand. In addition, qualitative explanations from representative users of a brand are generated. These qualitative explanations can be users' comments on the brand from social media, responses to questions posed to the users about their opinions regarding the brand, or any other suitable manner of obtaining feedback from the users, for example. In one illustrative embodiment, if the collected feedback from social media is insufficient, prompts may be generated and output to representative users of a personality trait, such as via crowdsource sources interface 430 or other communications interface, to describe their perceptions of the brand on the corresponding personality trait. However, rather than asking every participant to answer 42 questions of a brand (using a brand personality survey), the mechanisms of the illustrative embodiments may identify representative users for an individual trait and only asks these identified representative users one corresponding question to further elaborate on their opinion of the brand with regard to the particular personality trait that they are associated with. Again, representative users may be identified when analyzing the crowdsource information which includes identifiers of the users providing the content in the crowdsource information such that users who have submitted portions of the crowdsource information that have a relatively higher number of matches of their submitted content to the features associated with a particular brand personality trait may be selected as representative users for that brand personality trait.

If the minimum threshold level of confidence is met, then the predicted or inferred BPS is output (step 560). In addition, in a parallel operation, subjects are identified and user/consumer feedback is generated (step 570). In two parallel operations, content analysis may be performed (step 575) in order to identify any new traits (if any) for use in future BPS generation (step 580). The operation for performing content analysis and generating new traits will be described in greater detail hereafter with regard to FIG. 6. In addition, from the user/consumer feedback, qualitative explanations of inferred BPS may be generated and output (step 590) for use in conjunction with the output inferred BPS (step 560).

Figure 6:
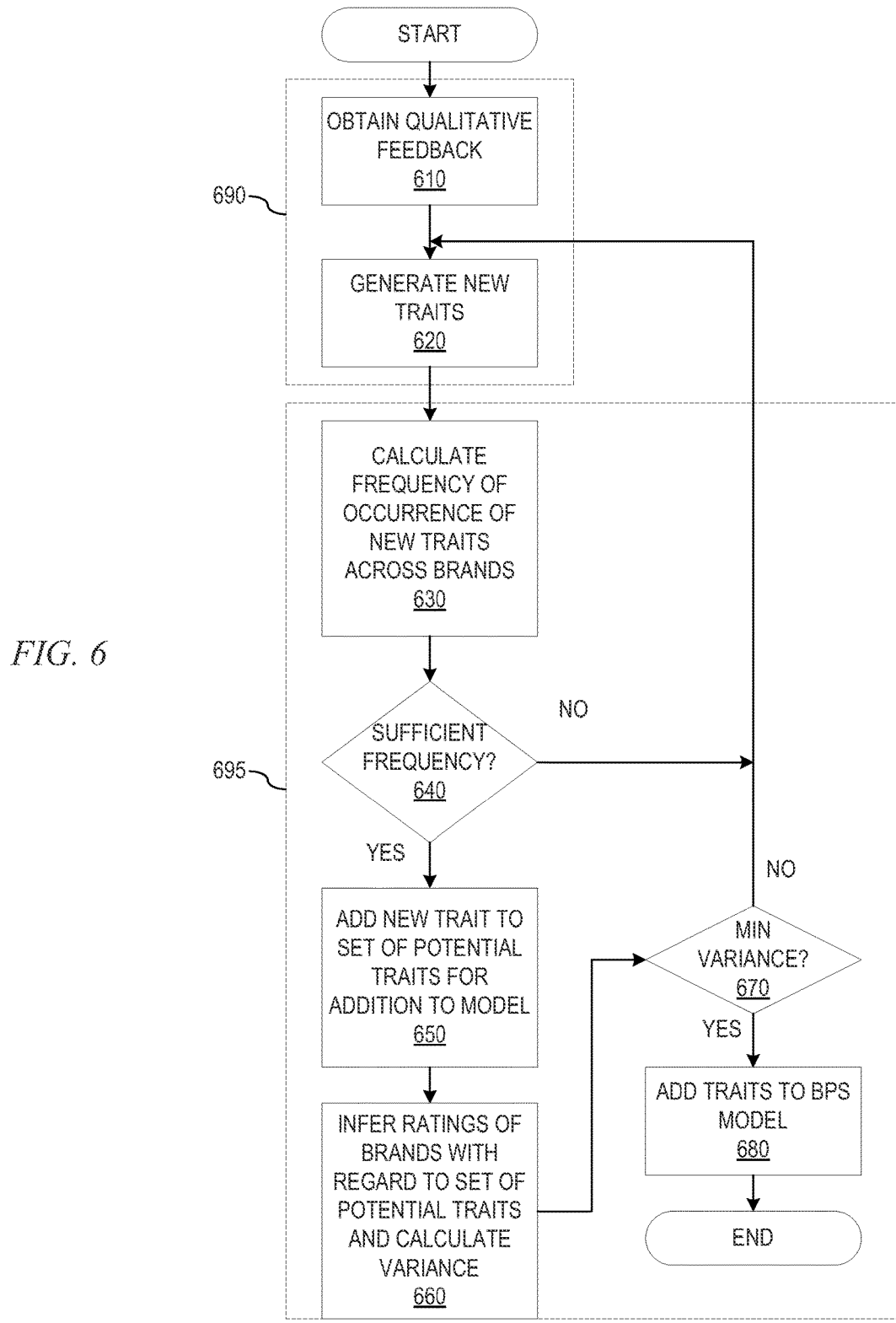
FIG. 6 is flowchart outlining an example operation for generating new traits for a BPS based on crowdsource feedback in accordance with one illustrative embodiment.

FIG. 6 is flowchart outlining an example operation for generating new traits for a BPS based on crowdsource feedback in accordance with one illustrative embodiment. The operation outlined in FIG. 6 may be applied to the crowdsourcing input received as part of step 570 in FIG. 5, for example, in order to generate the new traits that are output as part of step 580 for example, and returned to the computation operations 520, 530.

As shown in FIG. 6, the operation comprises two stages: candidate trait generation 690 and candidate trait validation 695. In the first stage 690, content analysis techniques, e.g., topic modeling techniques, keyword identification, key phrase identification, pattern matching, or the like, are applied to discover new traits (step 620) from representative users' qualitative feedback (received in step 610) of the brand from the crowdsourcing sources. These traits are added to a pool of candidate brand personality traits as part of step 620. In the candidate trait validation stage 695, the frequency of occurrence of the candidate traits across a plurality of brands is calculated and compared to a threshold frequency (step 630). If the candidate trait frequency of occurrence meets or exceeds the threshold frequency (step 640), then the candidate trait is added to a set of traits for potential addition to the brand personality model (step 650). Ratings of brands with regard to the set of potential traits for addition to the brand personality model are inferred using the mechanisms of the illustrative embodiments (step 660). A variance of the inferred ratings on the added traits from the brands is calculated and compared against a threshold variance (step 670). If the variance is less than the threshold variance, then it is considered to be a newly identified trait that can be used in the BPS model for future BPS value prediction or inference (step 680).

As an example, consider a scenario in which a newly discovered trait is of the type "professional" from user representative feedback. In step 620, topic modeling techniques, e.g., Latent Dirichlet allocation, may be applied to generate new traits, e.g., "professional", from the representative users' qualitative feedback of a brand (obtained in step 610). In step 630, the illustrative embodiment counts the frequency of the trait "professional" with regard to a database of personality traits of other brands, e.g., the trait "professional" appears in more than 30% of brands in the database (30% is the threshold in this example). If, in step 640, the frequency count for the trait "professional" appears in 30% or more of the brand personality traits of other brands, then in step 650, the illustrative embodiment may adopt a Latent Aspect Rating Analysis technique to infer the brands' ratings on the candidate trait "professional."

In step 660, the illustrative embodiment may compute a variance of the inferred ratings on the trait "professional" from the brands. If the rating variance of the trait passes a threshold (step 670), it is considered to be a newly identified brand personality trait beside the existing brand personality traits in the BPS (step 680). The threshold, in some illustrative embodiments, may be the media of the variances of the existing brand personality traits in the exiting BPS.

Thus, the brand personality inference system 400 provides mechanisms for generating a brand personality model and training that brand personality model based on ground truth data, e.g., survey data, and crowdsource information, such as may be obtained from social networking sources (e.g., Facebook™, Twitter™, Instagram™, etc.), business networking sources (e.g., Glassdoor™, LinkedIn™, etc.), and the like. In some illustrative embodiments, the crowdsource information is natural language text information that is processed using natural language processing mechanisms to extract features, select features representative of the particular brand personality traits and/or principle driving factors of brand personality, and generate a brand personality model using these extracted and selected features.

The brand personality model may then be utilized during runtime to predict or infer a brand personality scale (BPS) representation of a brand's personality comprising a plurality of personality traits and values with regard to these personality traits, where the values are indicative of the strength of association of the personality trait with the particular brand. Moreover, the mechanisms of the illustrative embodiments are operable to select new brand personality traits that are to be added to the brand personality model for evaluation with subsequent brands. The output generated may comprise the inferred BPS representation of a brand as well as a qualitative explanation of the inferred BPS which may be provided to a brand manager or other authorized user.

Brand Comparison System

The above brand personality inference system mechanisms, e.g., brand personality inference system 230 in FIG. 2, for determining a predicted or inferred brand personality may be utilized to generate brand personality scales (BPS's) for a plurality of different brands. The brand comparison system 240 in FIG. 2 may further be utilized to compare the BPS for a plurality of brands to identify potential gaps between brands, potential competitors and/or partners for a brand owner or brand manager, as well as brand relationships, as described hereafter.

Figure 7A:
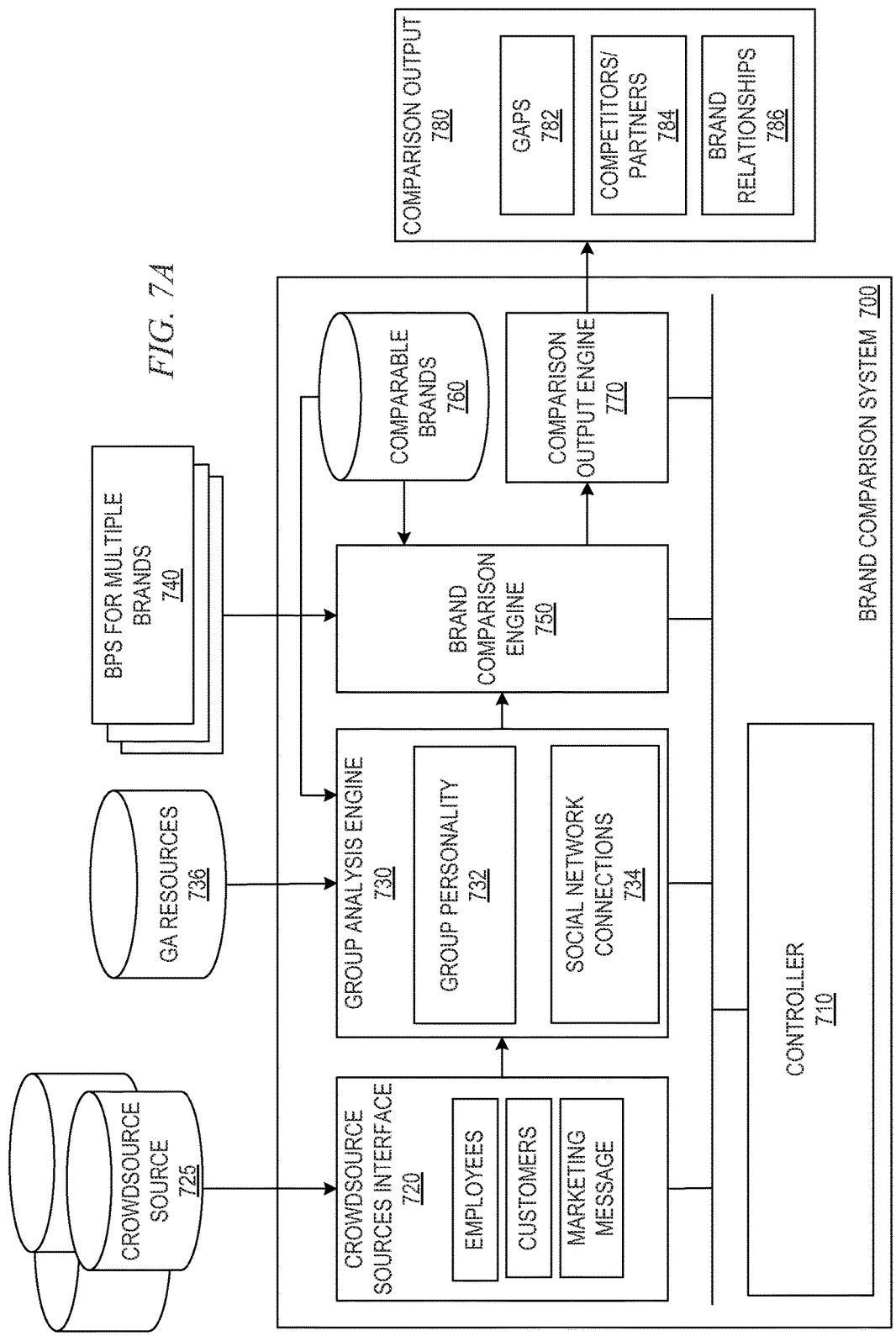
FIG. 7A is an example block diagram of a brand comparison system in accordance with one illustrative embodiment.

FIG. 7A is an example block diagram of a brand comparison system 700 in accordance with one illustrative embodiment. As shown in FIG. 7A, the brand comparison system 700 receives as input the brand personality scales (BPS's) for multiple brands 740. In some illustrative embodiments, these BPS's 740 may be the inferred BPS's generated using the brand personality inference system 400 in FIG. 4, for example. In other illustrative embodiments, the BPS's 740 may be generated in any other suitable manner depending upon the implementation. The BPS's 740 comprise the BPS for the brands of interest to the comparison and may include additional BPS information for other brands that are not directly part of the comparison, e.g., other comparable or complimentary brands, for example.

Similar to the brand personality inference system 400 in FIG. 4, the brand comparison system 700 further obtains as input, via the crowdsource sources interface 720, crowdsource information from various crowdsource sources 725 which may include sources associated with the various principle driving factors of brand personality, i.e. sources that provide crowdsource information in the areas of employee imagery, user (customer) imagery, and other marketing message imagery (stakeholder imagery), e.g., marketing messages, and the like. Other marketing message imagery or stakeholder imagery may include, for example, brand personality information associated with brand endorser messages, official announcements, and any marketing messages associated with the brand. The particular crowdsource information obtained is preferably from crowdsource sources 725 associated in some way with the brands or otherwise reference the brands being compared. For example, the crowdsource information may be obtained from accounts associated with the brand on social networking websites, business networking websites, a brand owners own computing systems, trade publication sources, or any other corpus of natural language information that may be analyzed using natural language processing techniques to extract information indicative of the perception of the brand amongst one or more groups of people. In the same manner as described above, the crowdsource information may be categorized into different categories of crowdsource information such as employee imagery, user (customer) imagery, and marketing message or other stakeholder imagery.

Group analysis is performed by the group analysis engine 730 on the crowdsource information using group analysis resources 736. The group analysis resources 736 may comprise dictionary-based, image/graphic pattern based, or other resources that are indicative of different personality traits of individuals which can be used as a basis for analyzing the received crowdsource information, extracting features indicative of different personality traits, and associate those personality traits with consumers of brands. In one illustrative embodiment, the group analysis resources 736 may be similar to the FE resources 450 in FIG. 4, for example.

The group analysis comprises group personality analysis 732 and social network connections analysis 734. The group personality analysis 732 operates to compute personality attribute representations of the personalities of the individuals providing crowdsource information about a brand, e.g., consumers of the brand. The personality attribute representations of the consumers may be generated in a similar manner as described above with regard to brands by utilizing models of individual personalities having a plurality of personality traits. Tools such as IBM's Personality Insights™, available from International Business Machines (IBM) Corporation of Armonk, N.Y., may be used to generate such personality representations of individual consumers.

The personality representations of the individual consumers may be aggregated to generate a global personality representation of consumers of a particular brand. This aggregation may be done with regard to the separate principle driving factors of brand personality. That is, a separate personality representation for consumers may be generated for each of the employee insights, user (customer) insights, and other stakeholder or marketing message insights. In this way, the aggregate personality representation in each category of crowdsource information is generated to represent a particular type of group of persons.

The social network connections analysis 734 operates to compute the relationship between brands by examining relationships between the consumers of the brands, e.g., between users (customers, employees, and other stakeholders. For example, a customer of a brand can be the customer of another brand. The degree of overlapping customers of two or more brands, e.g., overlapping Twitter™ followers of two or more brands) is computed to capture the relationship between these two or more brands. Similarly, employees of a brand owner may have connections with employees of another brand owner in a professional network site, e.g., LinkedIn™. The number of connections between consumers is calculated to generate a metric of the degree of relationship between the two or more brands.

Thus, for example, in one illustrative embodiment, consumer accounts information, which may be part of the crowdsource information received via interface 720, may be analyzed for various crowdsource sources 725 to determine which consumers are associated with brand accounts. For example, if Brand XY has an account on a social networking website, and Brand ZP has an account on the social networking website, the followers or consumers that have associations within the social networking website are identified and the listings of associated consumers/followers are compared to identify followers/consumers that appear in both listings for Brand XY and Brand ZP.

The number of such consumers/followers that are associated with both brands is indicative of a degree of overlap of the consumers/followers of the two brands. Various statistical measures may be calculated based on these raw numbers to determine indicators of brand relationships between Brand XY and Brand ZP. For example, the ratio of the number of overlapping consumers/followers to total unique consumers/followers may be indicative of the significance of the overlap, e.g., if the ratio is relatively large, e.g., equal to or greater than a predetermined threshold value, then it is indicative of the fact that most consumers of Brand XY are also consumers of Brand ZP, or vice versa. If the ratio is relatively small, e.g., less than a predetermined threshold value, then it is indicative of a gap between the consumers of Brand XY and Brand ZP. This information may be used as a basis for identifying potential competitors and partners within a market, e.g., brands that do not have significant overlap with each other while brands that have significant overlap are potential partners. This information may be used to drive marketing campaigns, communications sent to consumers, or the like.

It should be appreciated that the group analysis engine 730 performs the group personality analysis 732 and social network connections analysis 734 with designated comparable or complementary brands 760. That is, groupings of comparable or complementary brands 760 may be pre-generated and used to identify which brands should be compared with regard to both group analysis and BPS analysis, as performed by the brand comparison engine 750 described hereafter. Thus, for example, a grouping of brands XY, ZP, RJ, and CK may be established as brands that are comparable or complementary. A comparable brand is one that is associated with a same or similar product, service, location, concept, or other entity as another brand. This is often determined in commercial markets as products or services that provide a same product/service as another brand, e.g., Ford Motor Company™ is comparable with Chevrolet™ and the Apple™ brand is comparable with the IBM™ brand in that both companies provide similar products and services. Apple™ may also be comparable to Android™ since both companies provide similar wireless phone product, yet IBM™ may not be comparable with Android™. Complementary brands are those that are associated with entities that are not of the same type, but complement each other. For example, the brand Microsoft™ may be complementary to Dell™ since Dell™ is a computer manufacturing company and Microsoft™ is a software manufacturing company.

Thus, by designating groupings of the comparable or complementary brands 760, the analysis performed by the group analysis engine 730 and brand comparison engine 750 may be targeted to the particular groupings and the brands within those groupings.

The results of the group analysis 730 comprise the group personality representations of consumers of the brands of a group as well as the social network connection statistics of the consumers of the brands of that group, e.g., 56% of consumers of brand XY also are consumers of brand ZP. This information is output to the brand comparison engine 750 for comparison between brands of the group of comparable or complementary brands. The brand comparison engine 750 may compare the group personality representations of consumers of various brands so as to identify gaps between the personalities of consumers of the various brands in the group of comparable/complementary brands. For example, the group personality representations may comprise similar personality traits and corresponding values associated with these personality traits as discussed above with regard to brand personalities, or similar personality representations may be generated with different personality traits that are specific to individuals rather than brands.

In addition to the group analysis engine 730 analysis with regard to group personality 732 and social network connections 734, the brand comparison engine 750 further performs comparison of the BPS for the brands of the specific group so as to identify differences, or gaps, between the various brands. These gaps may be calculated with regard to each individual brand personality trait, brand personality dimensions, or the like. The degree of difference between the BPS may be calculated on an individual trait basis or on a general aggregate level, e.g., Brand XY is considered older than Brand ZP. The differences may be numerical differences of the scores of the corresponding brand personality traits of the brands, for example.

In some illustrative embodiments, the BPS of the brands of a grouping of brands is used to compute a degree of brand personality singularity for the group, where brand personality singularity refers to a singular idea or impression that people have inside their mind about a brand or group of brands. If a brand's personality is more focused, i.e. there is a higher degree of singularity, then people are more likely to remember that brand and associate the corresponding personality traits with that brand. The mechanisms of the illustrative embodiments utilize the BPS of the brand to measure the degree of singularity and the stability of the singularity over time. The brand personality singularity metrics consider the variances of brand personality scales and the changes of these variances over time. The "variance" of a brand personality scale itself is the variance between the individual brand personality traits that make up the brand personality scale. The variance may be calculated with regard to groupings of traits, e.g., dividing a brand personality scale having 42 brand personality traits into three groups of 14 brand personality traits each.

For example, a clustering technique may be used to divide the personality traits into a number of groups, e.g., groups representing clusters of brand personality traits that have similar brand personality trait values. For example, a brand personality scale may have 42 brand personality trait ratings which may be clustered into three groups of 14 brand personality traits using K-means. The variances between groups of brand personality traits and within groups of brand personality traits may be used to calculate the degree of singularity, e.g., a ratio of the variance between the group and other groups, to the variance within the group. For example, the variance between groups may be generated by computing the mean of each group and then computing the variance between these three groups. The variances within each group may be calculated by computing the variance between each pair of members of the group and then computing the mean of the variances. A higher value ratio, i.e. a higher singularity value, is indicative of a brand having a stronger association of the brand to a corresponding group of brand personality traits. It should be appreciated that the singularity is a numerical value, but is also correlated with the groups such that each group may have a singularity value and a group having a highest singularity value is indicative of the set of brand personality traits that are most likely representative of the brand and remembered by consumers when presented with the brand.

Thus, the degree of brand personality singularity can be computed for an individual brand. It should further be appreciated that the mechanisms of the illustrative embodiments may be utilized to compute the brand personality singularity for each brand individually and then compare these brands based on the brand personality singularity. Moreover, the brands may be clustered into sets of brands, e.g., brands that are comparable or complimentary, for which a brand personality singularity of each set of brands may be generated in a similar manner as described above but on the entire set of brands. The brand personality singularities of the sets of brands may then be compared in a similar manner such that a comparison of sets of brands may be performed.

With the gap analysis performed by the brand comparison engine 750 based on the BPS for multiple brands 740 in the grouping of comparable brands 760, the brand comparison engine 750 calculates, for each brand, a degree of brand personality singularity. The difference between degrees of brand personality singularity between brands is calculated so as to see which brands are more focused than others and thus, which brands are more likely to be remembered by consumers. This information may provide to a brand manager an indication of the relative ranking of brands within the grouping of comparable/complementary brands 760 with regard to the strength of consumer perception.

The results of the BPS based comparisons and group analysis may be output to the comparison output engine 770 which performed operations to generate a comparison output 780. The comparison output preferably comprises a visualization interface that provides various views of comparisons between brands of the comparable/complementary brand group 760 with regard to brand personality scale gaps 782, identification of potential competitors/partners 784, and brand relationships 786. For example, dominant traits and the singularity of brand personalities for the various brands of the group may be visualized, differences between degrees of singularity may be visualized, highlighting and identification of which owners of which other comparable/complementary brands are potential competitors because of an insignificant amount of overlap between the consumers of the brands, highlighting and identification of which owners of which other comparable/complementary brands are potential partners because of a significant amount of overlap between the consumers of the brands (where significant/insignificant may be measured based on a comparison to one or more threshold values), and relationships between the group personality traits of the consumers of the various brands. The comparison output 780 may be provided via a graphical user interface (GUI) or other interface that permits interaction with the output to obtain various levels of information including drilling down into visualizations to obtain detailed underlying data, filtering of data, detail-on-demand type interfaces, and the like. Additionally, a time-series visualization technique may be applied to highlight changes in brand personality perception gaps and brand personality singularity at specific time periods.

Figure 7B:
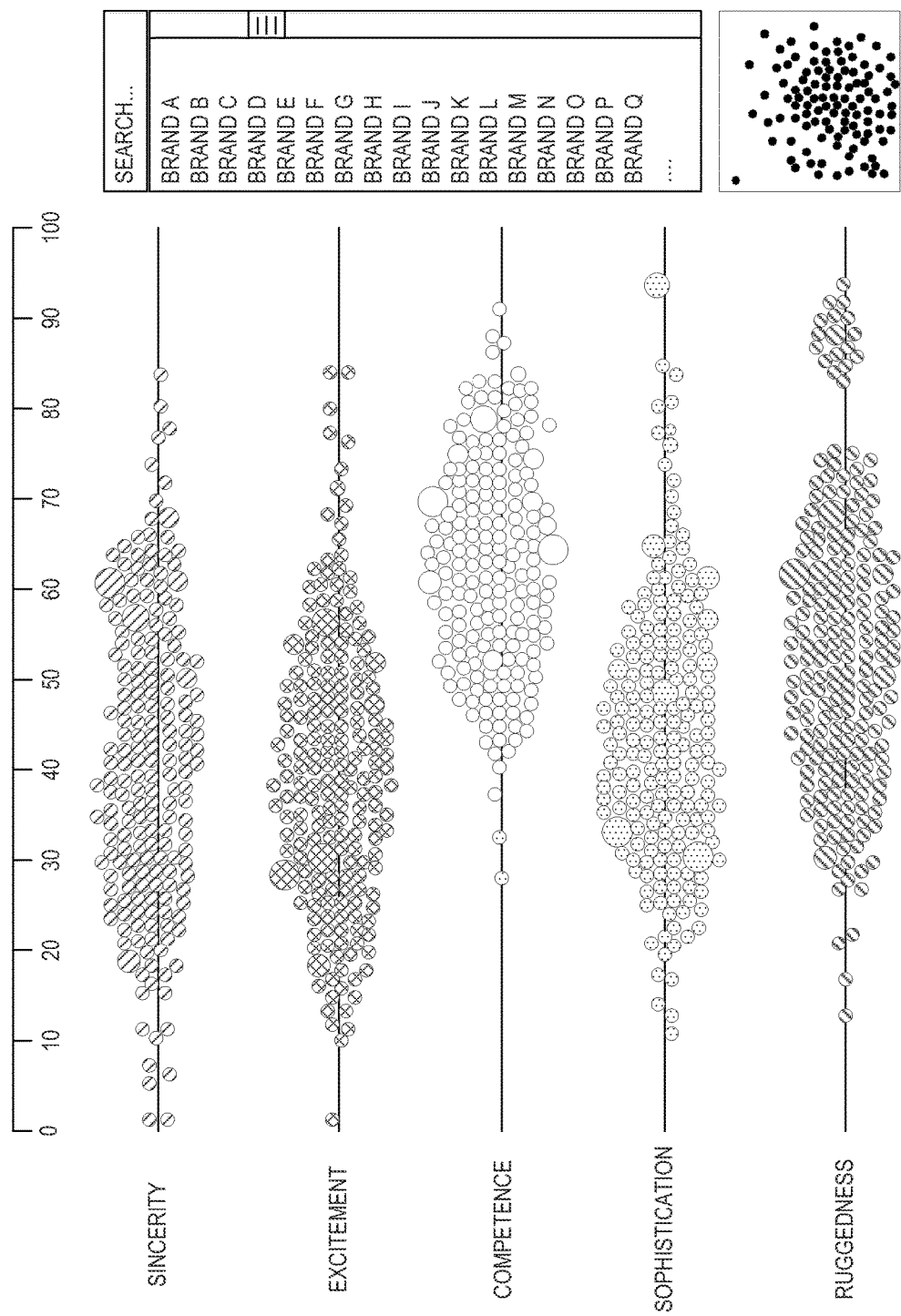
FIG. 7B is an example diagram of a visual output of a brand comparison system that may be part of a graphical user interface in accordance with one illustrative embodiment.

FIG. 7B is an example diagram of a visual output of a brand comparison system that may be part of a graphical user interface in accordance with one illustrative embodiment. As shown in FIG. 7B, each node represents a separate brand and the size of each node encodes the brand personality singularity. That is, larger size nodes have a higher value singularity value than smaller size nodes and thus, the larger nodes identify brand personality traits that are more representative of the brand personality for the brand with regard to the particular grouping of personality traits.

In this example, the mechanisms of the illustrative embodiments group the personality traits of the BPS into five dimensions, i.e. "Sincerity", "Excitement", "Competence", "Sophistication", and "Ruggedness." The visualization shown in FIG. 7B shows the brands clustered on each dimension with medians of their values with regard to each of the dimensions shown as vertical lines in each cluster. In the bottom right of the visualization in FIG. 7B, the illustrative embodiments may compute the cosine similarity ratings between any two brands based on their BPS values and uses a force-directed graph visualization technique to visualize the relationship among the brands. If two nodes are close to each other in the bottom right visualization, this means that these two brands have similar personality traits. It should be appreciated that FIG. 7B is only an example visualization and many modifications to the depicted example may be made without departing from the spirit and scope of the present invention.

Figure 8:
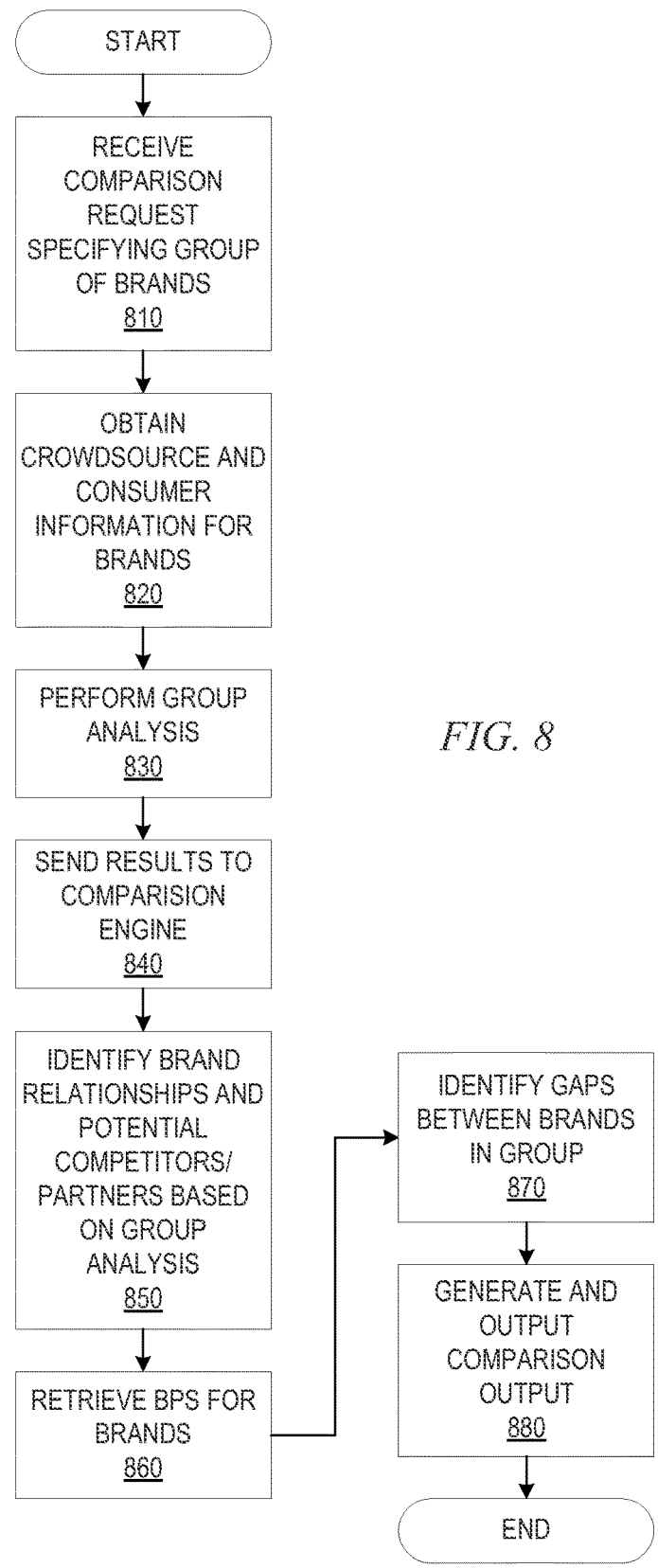
FIG. 8 is a flowchart outlining an example operation for performing brand comparisons in accordance with one illustrative embodiment.

FIG. 8 is a flowchart outlining an example operation for performing brand comparisons in accordance with one illustrative embodiment. The operation outlined in FIG. 8 may be implemented, for example, by the brand comparison system 700 in FIG. 7A.

As shown in FIG. 8, the operation starts with the receipt of a request to perform a brand personality comparison of brands in a specified group of comparable/complementary brands (step 810). The request may be received in response to a user, such as a brand manager, initiating the request via a computing system, such as a client computer being used to log onto the brand comparison engine and utilizing an interface to submit a request. Alternatively, the request may be periodically scheduled, automatically generated by another process, initiated in response to the occurrence of an event, such as an update to a group of comparable/complementary brands 760, or the like.

Crowdsource information for the brands in the group of brands to be compared, as identified in the request, is retrieved from one or more crowdsource sources (step 820). Group analysis is performed based on the crowdsource information, consumer information providing the crowdsource information, or the like, using group analysis resources (step 830). The group analysis may comprise group personality analysis and/or social network connections analysis, for example. The results of the group analysis are output for comparison by a brand comparison engine (step 840). The brand comparison engine identifies brand relationships and potential competitors and partners based on the group analysis (step 850). BPS for the brands are retrieved (step 860) and compared to generate identification of gaps between brands in the group of comparable/complementary brands (step 870). A comparison output is generated and output that includes visualizations of the results of the comparisons (step 880). The operation then terminates.

Thus, in addition to providing mechanisms for generating inferred brand personality scales (BPS's) for one or more brands, the illustrative embodiments further provide mechanisms for comparing brand personalities and performing group analysis to provide greater insight into the relative perception of a brand to other brands, such as brands considered to be comparable and/or complementary. In the case of comparable or complementary brands, the comparison identifies and highlights potential competitors and partners of a brand of interest. Moreover, the comparison also identifies the amount of relatedness that one brand has to the other with regard to cross-brand consumption by users. Furthermore, differences between the perceived personalities of brands may be identified. All of this information is made accessible to users via a visualization mechanism.

Brand Personality Perception Gap Assessment System

As touched upon above, one analysis that may be performed by the mechanisms of the illustrative embodiments is to compare the consumers and BPS of brands which includes identifying gaps between brands. In addition, the mechanisms of some of the illustrative embodiments are further configured to identify brand perception gaps between the inferred brand personality of a brand and an intended brand personality. In doing so, the mechanisms of the illustrative embodiments are able to generate outputs indicating the gaps, e.g., numerical differences or a function, statistical measure, or the like, of such numerical differences, between intended and inferred personality of a brand as well as temporal changes of the inferred personality of the brand. The output may be used as a basis for generating recommendations as to actions (solutions) to be taken to bring the inferred brand personality more in line with the intended brand personality, i.e. close the gap or reduce the size of the gap, and, in some cases, initiate performance of actions by other computing systems to perform operations to modify the inferred brand personality as determined from the crowdsourcing sources.

Figure 9:
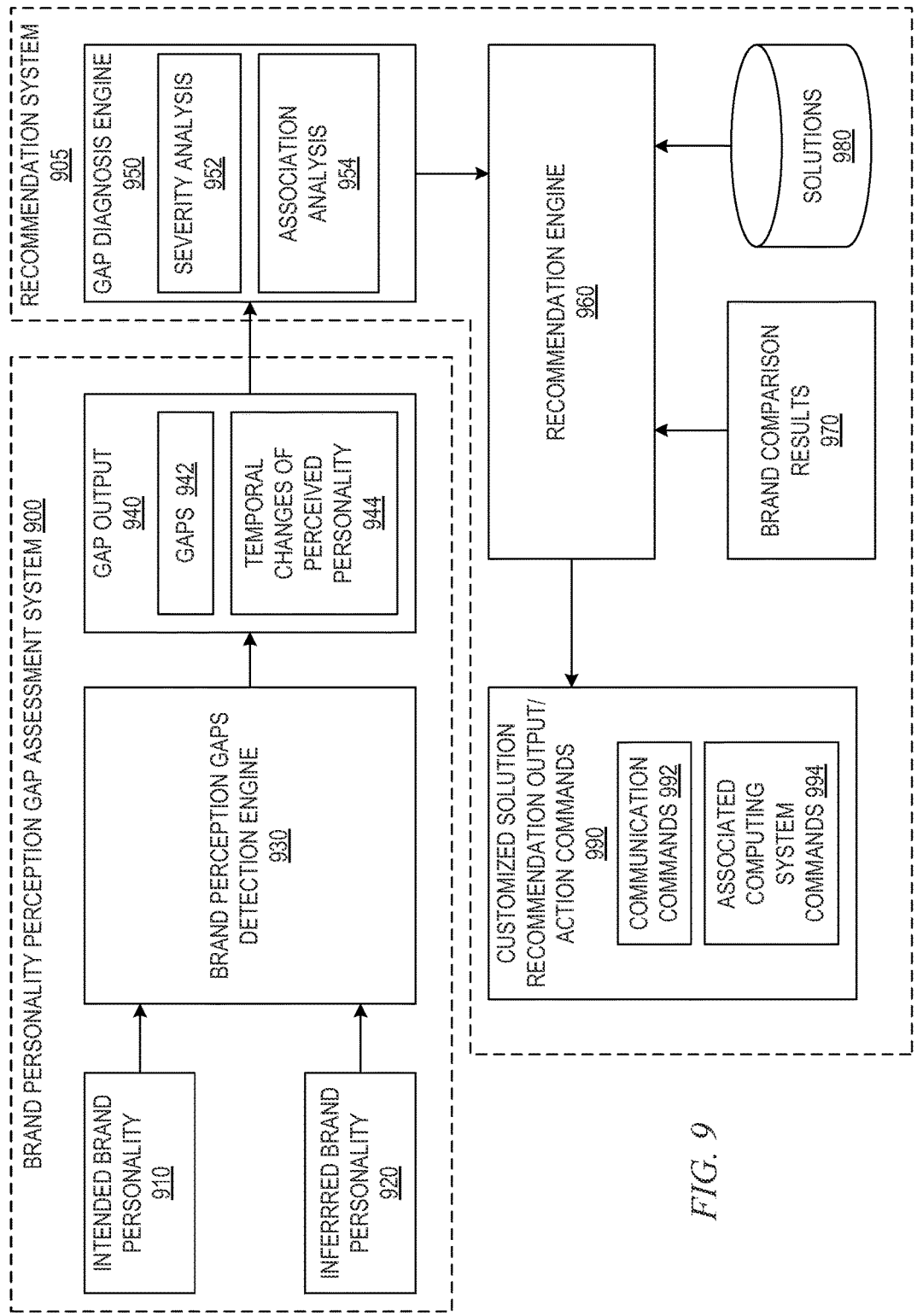
FIG. 9 is an example block diagram illustrating a brand personality perception gap assessment system and brand personality perception gap recommendation system in accordance with one illustrative embodiment.

FIG. 9 is an example block diagram illustrating a brand personality perception gap assessment system and brand personality perception gap recommendation system in accordance with one illustrative embodiment. The brand personality perception gap assessment system 900 is designed to help brand manager identify perception gaps of their brands. The input to the brand personality perception gap assessment system 900 comprises brand perception gaps detection engine 930 which receives as input an intended brand personality 910 and an inferred brand personality scale(s) 920.

The inferred brand personality scale(s) 920 may comprise a historical set of inferred brand personality scales for the brand such that a temporal analysis of the inferred brand personality scales may be performed. The temporal analysis may compare successive brand personality scales over time to determine trends in the perceived brand personality. The trends may be compared to the intended brand personality 910 to determine if changes in the perceived brand personality are approaching the intended brand personality 910 or are trending away from the intended brand personality as a whole or on an individual trait or group of traits (dimension) basis. The trends are indicative of whether brand management operations are successfully being performed to achieve the desired perceived brand personality.

As with the gap analysis performed by the brand comparison engine 750 in FIG. 7A, a degree of singularity of brand personality may be calculated for both the intended and inferred brand personalities 910 and 920 for comparison to identify differences. The differences provide a snapshot as to the instant difference between what persons perceive regarding the brand personality and what the brand manager or owner intends the persons to perceive. The differences are indicative of a degree, or severity, of disconnect between the brand owner/manager and the public with regard to the brand personality. These differences may be represented on individual trait basis, groupings of traits, in the aggregate as a global brand personality for the brand, or the like.

For example, the input data 920 may be a set of BPS rating values of one brand and the corresponding timestamps. The brand perception gaps detection engine 930 of the brand personality perception gap assessment system 900 may compute the first order and second order derivatives based on the time series data. The brand perception gaps detection engine 930 of the system 900 may detect the general trend of increasing or decreasing on these metrics (e.g. BPS ratings) based on a comparison of current and previous values of these metrics.

The similar time series analysis can also be applied to the principle driving factors of a brand. For example, the brand perception gaps detection engine 930 may detect the changes of user imagery, employee imagery, and/or marketing message imagery over time. User imagery, employee imagery, and/or marketing message imagery may be measured by LIWC categories or advanced topic modeling techniques (e.g. Latent Dirichlet allocation), as mentioned above.

A gap output 940 may be generated that includes identification of the gaps (942) between the intended and inferred brand personalities 910 and 920, e.g., the numerical difference between the inferred brand personality trait values and the intended brand personality trait values, or a function or statistical measure of such a numerical difference. Moreover, as noted above, temporal changes of perceived personality 944 are also included in the gap output 940 which includes indications of trends of the perceived personality and whether the trends are trending towards or away from the intended brand personality 910. The gap output 940 may be output as a visualized output of the metrics 942, 944 in a similar manner as the comparison output 780 in FIG. 7A. In addition, the gap output 940 may be provided to a brand personality perception gap recommendation system 905.

Brand Personality Perception Gap Recommendation System

As further shown in FIG. 9, the gap output 940 is provided to a gap diagnosis engine 950 which performs severity analysis 952 and association analysis 954. The severity analysis 952 quantifies the severity of the gap between the inferred and intended brand personalities 910 and 920 and further infers possible factors associated with these gaps. A severity rating may be computed for each personality trait, group of personality traits, or the BPS as a whole, by calculating numerical differences of the inferred brand personality 920 and the intended brand personality 910, on an individual brand personality trait basis, a principle driving factor basis, a combination of these two, or the like, and correlating the numerical difference to pre-defined severity ratings. A global severity rating for the gaps between the inferred and intended brand personalities 910, 920 may be calculated as a function of the individual severity ratings of the brand personality trait gaps and/or principle driving factor gaps. For example, an average of the severity ratings of the individual brand personality trait gaps may be calculated and used as the global severity rating for gaps associated with the inferred brand personality 920.

The association analysis 954 assesses relevance factors related to perception gaps. The relevance factors may be, for example, the weightings associated with the principle driving factors or individual brand personality traits provided in the brand personality model as described above. In other illustrative embodiments, the relevance factor related to perception gaps may be computed by the lagged correlation between the principle driving factor and the brand personality traits. The principle driving factor (e.g., measured by LIWC over time) and the brand personality trait rating values over time can be viewed as two time series data sets. The lagged correlation refers to the correlation between two time series shifted in time relative to one another. The higher the correlation means the factor is more relevant.

The association analysis 954 may comprise the performance of simulations using predictive models in the brand personality inference system, for example, to estimate what principle driving factors are likely to affect the predicted or inferred brand personality perceptions. The predictive models may look at history data for the brand to identify what solutions were previously performed and the corresponding realized change in the brand personality traits as a result of the solution being implemented to determine a predicted change for future applications of the solution. The predictive models may also look at the weights of the principle driving factors and/or brand personality traits in the brand personality trait model(s) and determine which are likely to affect the predicted or inferred brand personality perceptions the most based on the weightings in the model(s). Of course, other types of predictive models may also be utilized without departing from the spirit and scope of the present invention.

Based on an evaluation of the severity of the gaps between the inferred brand personality 920 and the intended brand personality 910, as well as the identification of the principle driving factors for affecting the predicted or inferred brand personality perceptions, the recommendation engine 960 selects solutions from a solutions knowledge base 980 to be recommended. The solutions in the solutions knowledge base 980 may be good solutions pre-defined by marketing experts. Moreover, the recommendation system 905 may collect or record previous actions performed by marketers/managers for this particular brand with these previous actions being viewed as candidate solutions.

The selection of a recommended solution may be performed, for example, based on attributes associated with the solutions in the solutions knowledge base 980. In one illustrative embodiment, each solution in the solutions knowledge base 980, comprises two attributes: a solution weight for a principle driving factor, and a solution severity level. The solution weight for a principle driving factor, e.g., a weight value within a numerical range from 0.0 to 1.0. A solution may have effects on the principle driving factors. For example, obtaining Twitter™ followers may influence the User Imagery factor, but does not influence the Employee Imagery factor. Thus, this solution's weight for the User Imagery factor may be relatively higher than its weight for the Employee Imagery factor, e.g., 1.0 for User Imagery and 0.0 for Employee Imagery. These weight values may be set by marketing experts in the solutions knowledge base 980 in association with the solution. For example, each solution entry in the solutions knowledge base 980 may have the solution information indicating the details of the recommended solution and corresponding weight values for each of the driving factors.

Moreover, the solution entries in the solution knowledge base 980 may include a solution level value indicative of a severity level of the brand personality gap for which the solution is suitable. For example, obtaining 100 Twitter™ followers is a low level solution, while obtaining 10,000 Twitter™ followers is a high level solution. Thus, the solution level value is set by a marketing expert based on the relative degree of solution determined by the marketing expert. The solution level is positively correlated to the severity rating such that higher severity ratings for brand personality gaps correlates with higher solution level.

In some illustrative embodiments, rather than the marketing expert setting these values, these two solution attributes can be computed from the temporal data of a brand by using lagged correlation analysis. For example, after the solution "obtaining Twitter™ followers" is performed, the degree of the changes in the factors (e.g. User Imagery) can be used as solution weights for these factors, e.g., a degree of change in User Imagery BPS value may be used to compute a new weight for the User Imagery factor and an amount of change in the current weight and new weight for the User Imagery factor may be used to compute an relative solution level, e.g., relatively large changes are indicative of a higher solution level than relatively smaller changes.

In some illustrative embodiments, the solution entries in the solutions knowledge base 980 comprise solution templates specifying the brand personality trait principle driving factor (e.g., User Imagery, Employee Imagery, Marketing Message Imagery, or the like) affected by the solution, a description of the actions to be performed as part of the solution, an identification of the target of the solution, and an evaluation of the benefit expected to be obtained by the implementation of the solution. The description of the actions to be performed as part of the solution may contain a textual description of what action can be taken, case studies, and/or the like. The identification of the target of the solution may comprise an actionable link that identifies a target population to which the action is to be directed or upon which the action is to be performed. The evaluation of the expected benefit may also comprise an actionable link that runs a simulation which indicates if X % of the target population performed the action, or provided positive feedback in response to the action being performed on the target population, etc., the expected change in brand perception that would result.

One example of such a template may be as follows:

Example 1

Principle Factor Impacted: User Imagery
Description of Action: Provide coupons as rewards to existing Twitter™ followers to refer new customers. According to psychology theory, people are more likely to redeem coupons if they score higher in the Big 5 facets Orderliness, Self-Discipline, and Cautiousness, and lower in Immoderation.
Target: Clicking this link will suggest what sub-set of exiting Twitter™ followers you should give the coupons to. It will calculate personality portraits for current Twitter™ followers and provide a subset of people who should be provided rewards.
Benefit: A function that shows X % of coupons redeemed and corresponding addition of Y % of new followers and improved brand perception of Z % as below:

| Coupons Redeemed | New Followers | Brand Perception Improvement |
| --- | --- | --- |
| 2% | 10 | 0.10% |
| 5% | 100 | 0.20% |
| 10% | 500 | 2.00% |
| 30% | 700 | 5.00% |
| 50% | 800 | 5.50% |

Similar types of example templates may be generated for other ones of the principle driving factors:

Example 2

Principle Factor Impacted: Employee Imagery
Description of Action: Hire employees with above average stability.
Target: Clicking this link will use the LinkedIn™ profiles (or resumes) of your existing employees to extract skill sets required for the organization end then identify people with matching skill sets. Further, this list is filtered to identify people that have higher percentiles/scores on stability dimension.
Benefit: A function that shows if X % of people join in Y time, then the brand perception improves by Z %.

Example 3

Principle Factor Impacted: Marketing Message Imagery
Description of Action: Send out messages that show more cheerfulness.
Target: Clicking this link allows brand managers to provide their press release/marketing message and use IBM's Tone Analyzer™ service to refine the message to increase cheerfulness quantification.
Benefit: A function that allows brand managers to assess what % of cheerfulness in what number of messages will lead to improvement in brand perception.

The brand recommendation engine 960 may compose a combination of templates for different solutions based on a desired benefit so as to help a brand manager evaluate the benefits and decide on the right approach for perception improvement. For example, if the brand manager seeks to improve brand perception by 2%, the recommendation engine 960 may output a result that indicates that to improve brand perception by 2%, use solution template 1 to obtain 100 additional followers on Twitter™ and/or use solution template 2 to obtain 10 new employees and/or send out 5 marketing messages. The brand manager may then make an informed decision, based on an overlay of cost and time dimensions on the above functions, to find an optimal solution for achieving the desired benefit.

Thus, the recommend solution is customized according to the specific brand comparison results 970. The recommended solution is output 990 for use by a brand manager or other authorized user. In one illustrative embodiment, the output 990 may be a notification of the actions that are recommended that the brand manager initiate to bring the inferred brand personality 920 closer to the intended brand personality 910. In other illustrative embodiments, the selected and customized solutions may include commands to be sent to other computing systems, applications, and the like, to initiate the actions recommended to improve the inferred brand personality 920 such that it more closely resembles that intended brand personality 910.

For example, commands may be output as part of the output 990 to other computing systems and/or applications to initiate broadcast of communications to consumers. For example, an electronic mail advertising campaign or information blanketing campaign may be initiated by causing an electronic mail system to broadcast an electronic mail advertisement to a mailing list via one or more data networks. As another example, commands may be sent to computing systems to print or output coupons for disbursement to consumers. As another example, commands may be sent to computing systems to initiate video or audible output via one or more video and/or audible broadcasting systems. A plethora of other actions may be initiated based on commands output as part of the output 990 depending on the particular desired implementation. Thus, the mechanisms of the illustrative embodiments not only improve the operation of the computing systems on which they operate but also perform actions to generate concrete and tangible results outside the computing systems on which the mechanisms of the illustrative embodiments operate.

Figure 10:
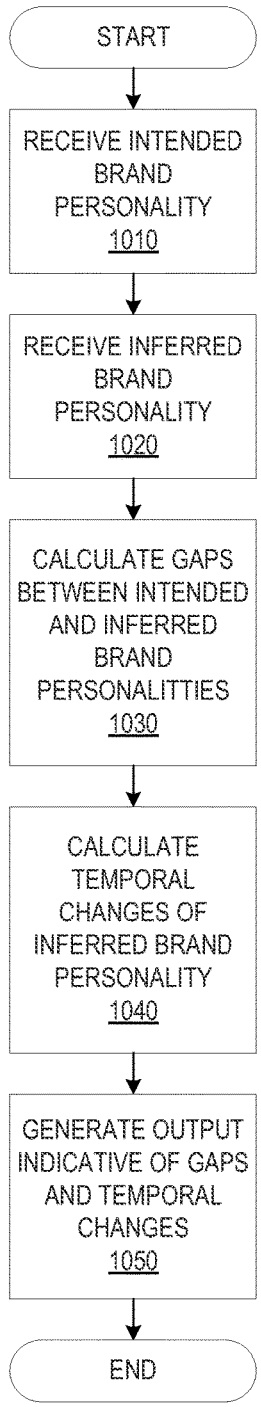
FIG. 10 is a flowchart outlining an example operation for performing brand personality perception gap assessment in accordance with one illustrative embodiment.

FIG. 10 is a flowchart outlining an example operation for performing brand personality perception gap assessment in accordance with one illustrative embodiment. The operation outlined in FIG. 10 may be implemented, for example, by the brand personality perception gap assessment system 900 in FIG. 9. As shown in FIG. 10, the operation comprises receiving an intended brand personality (step 1010) and an inferred brand personality (step 1020). Gaps between the intended and inferred brand personalities are calculated (step 1030) and temporal changes of the inferred brand personality are calculated (step 1040). A corresponding output is generated that indicates the brand perception gaps and the temporal changes of the perceived personality of the brand (step 1050). The operation then terminates.

Figure 11:
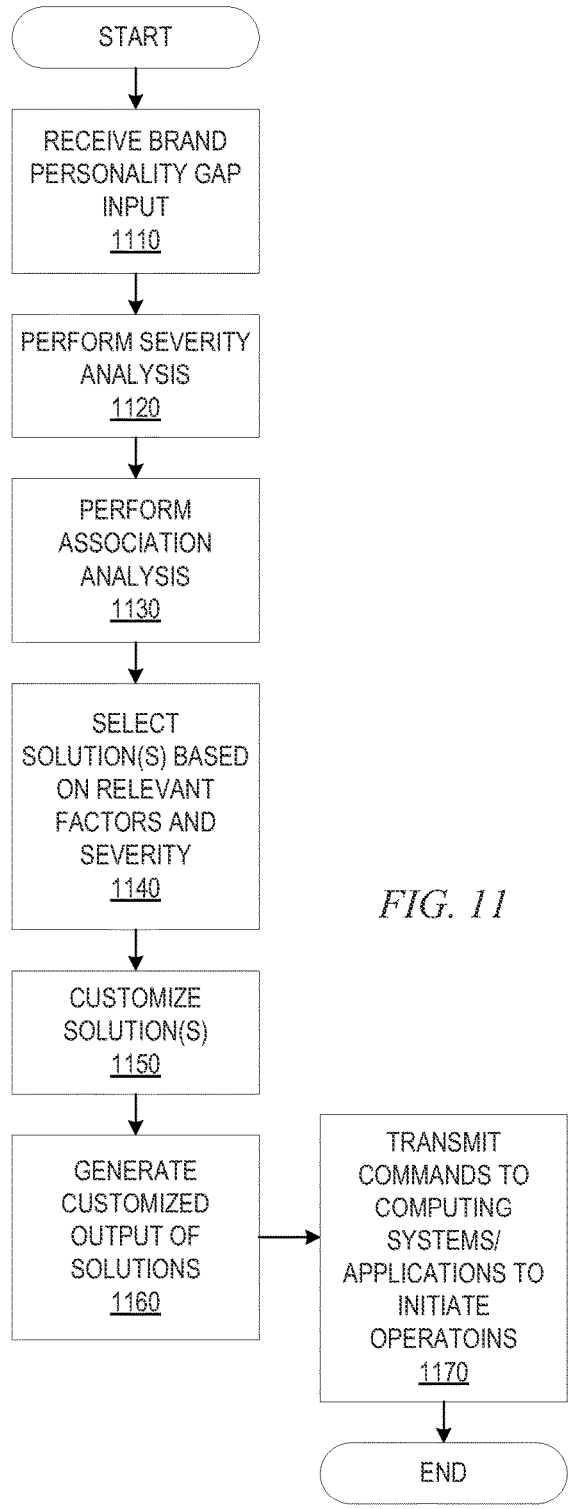
FIG. 11 is a flowchart outlining an example operation for performing brand personality perception gap recommendation and action command generation in accordance with one illustrative embodiment.

FIG. 11 is a flowchart outlining an example operation for performing brand personality perception gap recommendation and action command generation in accordance with one illustrative embodiment. The operation outlined in FIG. 11 may be performed, for example, by the brand personality perception gap recommendation system 905 in FIG. 9, for example. As shown in FIG. 11, the operation starts with the receiving of a brand personality perception gap input (step 1110). This input may be received, for example, as gap output 940 from brand personality perception gap assessment system 900 in FIG. 9. Severity analysis is performed on the input to determine a severity of the gap(s) indicated in the input (step 1120). Association analysis is performed on the input to identify the most relevant factors that affect the brand personality perception gaps identified in the input (step 1130). Based on the relevant factors and the severity of the gaps, one or more solutions are selected from a solution knowledge base (step 1140) and customized to the particular brand comparison results of the brand (step 1150). A customized solution output is generated (step 1160) which may include the transmission of commands to other computing systems to cause the other computing systems to perform actions in accordance with a solution for brining the inferred brand personality closer to the desired or intended brand personality (step 1170). The operation then terminates.

Thus, the illustrative embodiments provide mechanisms for not only predicting or inferring a brand personality based on analysis of crowdsource information and comparing brands to determine relationships between brands, but also provides mechanisms for determining gaps between inferred or predicted brand personality and intended or desired brand personalities. Moreover, the mechanisms of the illustrative embodiments further provide for the selection of solutions to bridge these gaps and even initiate actions through the sending of commands to other computing systems and/or applications to cause operations to be performed that are likely to bridge these gaps.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which when executed by the processor cause the processor to implement a brand personality perception gap assessment engine, the method comprising:
   receiving, by the brand personality perception gap assessment engine, an inferred brand personality for a specified brand;
   receiving, by the brand personality perception gap assessment engine, an intended brand personality for the specified brand;
   calculating, by the brand personality perception gap assessment engine, at least one gap between the inferred brand personality and the intended brand personality;
   outputting, by the brand personality perception gap assessment engine, an output indicating aspects of the at least one gap;
   searching, by the brand personality perception gap assessment engine, a solutions database for solutions associated with the at least one gap;
   selecting, by the brand personality perception gap assessment engine, at least one solution from the solutions database for reducing a size of the at least one gap; and
   automatically sending, by the brand personality perception gap assessment engine, a command to a computing system that causes the computing system to initiate an operation to implement the selected at least one solution, wherein selecting the at least one solution from the solutions database comprises:
   identifying one or more factors associated with the at least one gap at least by executing a simulation using a predictive model that predicts brand personality assessments for changes in crowdsourcing input data and a corresponding amount of change in the inferred brand personality; and
   selecting the at least one solution that minimizes the at least one gap based on results of executing the simulation.

2. The method of claim 1, wherein the operation is an operation to initiate distribution of a marketing message via an electronic transmission to consumers associated with the specified brand.

3. The method of claim 1, wherein calculating the at least one gap comprises calculating a severity level of the at least one gap, and wherein selecting the at least one solution from the solutions database comprises selecting the at least one solution based on the severity level of the at least one gap and severity levels associated with each of the solutions in the solutions database.

4. The method of claim 1, wherein calculating the at least one gap comprises identifying a principle driving factor associated with the at least one gap, and wherein selecting the at least one solution from the solutions database comprises selecting the at least one solution based on the principle driving factor associated with the at least one gap and principle driving factors associated with solutions in the solutions database.

5. The method of claim 1, wherein calculating the at least one gap comprises:
   calculating a severity level of the at least one gap; and
   identifying a principle driving factor associated with the at least one gap, and wherein selecting the at least one solution from the solutions database comprises selecting the at least one solution based on the principle driving factor, principle driving factors associated with solutions in the solutions database, the severity level of the at least one gap, and severity levels associated with each of the solutions in the solutions database.

6. The method of claim 1, wherein the output comprises a specification of the selected at least one solution, wherein the specification comprises actionable links to perform functions to implement aspects of the selected at least one solution.

7. The method of claim 6, wherein the specification of the selected at least one solution comprises a principle driving factor associated with the selected at least one solution, a description of an action to be performed as part of the selected at least one solution, a target of the selected at least one solution, and an expected benefit of the selected at least one solution.

8. The method of claim 1, wherein receiving the inferred brand personality for the specified brand comprises receiving, by the brand personality perception gap assessment engine, a plurality of brand personality scales for the specified brand indicating a historical representation of brand personality of the specified brand, and wherein the method further comprises performing a trend analysis on the plurality of brand personality scales to identify a trend in the plurality of brand personality scales over time.

9. The method of claim 1, further comprising:
obtaining, by a feature engine of the data processing system, first crowdsource information from a plurality of users obtained from one or more crowdsource computing systems;
generating, by the feature engine of the data processing system, one or more brand personality models at least by performing at least one of natural language processing on the first crowdsource information, image analysis on the first crowdsource information, or audible feature analysis on the first crowdsource information to extract features indicative of brand personality traits; and
applying, by a brand personality predictor of the data processing system, the one or more brand personality models to second crowdsource information associated with the specified brand to generate the inferred brand personality.

10. The method of claim 9, wherein the one or more brand personality models comprise a separate brand personality model for each of a plurality of brand personality traits specified in a brand personality scale, and wherein applying the one or more brand personality models to the second crowdsource information associated with the specified brand comprises applying each of the separate brand personality models to the second crowdsource information and combining results of the separate brand personality models to generate the inferred brand personality.

11. The method of claim 9, wherein applying the one or more brand personality models to the second crowdsource information associated with the brand to generate the inferred brand personality further comprises:
performing, by group personality analysis logic of the data processing system, a group personality analysis to identify personality traits of users providing the second crowdsource information; and
performing, by social network connections analysis logic of the data processing system, a social networking analysis to identify relationships between consumers of the brand based on the second crowdsource information, wherein the generation of the inferred brand personality is further based on results of the group personality analysis and the social networking analysis.

12. A computer program product comprising a computer readable storage medium having a computer readable program stored therein, wherein the computer readable program, when executed on a data processing system, causes the data processing system to implement a brand personality perception gap assessment engine that operates to:
receive an inferred brand personality for a specified brand;
receive an intended brand personality for the specified brand;
calculate at least one gap between the inferred brand personality and the intended brand personality;
output an output indicating aspects of the at least one gap;
search a solutions database for solutions associated with the at least one gap;
select at least one solution from the solutions database for reducing a size of the at least one gap; and
automatically send a command to a computing system that causes the computing system to initiate an operation to implement the selected at least one solution, wherein selecting the at least one solution from the solutions database comprises:
identifying one or more factors associated with the at least one gap at least by executing a simulation using a predictive model that predicts brand personality assessments for changes in crowdsourcing input data and a corresponding amount of change in the inferred brand personality; and
selecting the at least one solution that minimizes the at least one gap based on results of executing the simulation.

13. The computer program product of claim 12, wherein the operation is an operation to initiate distribution of a marketing message via an electronic transmission to consumers associated with the specified brand.

14. The computer program product of claim 12, wherein calculating the at least one gap comprises calculating a severity level of the at least one gap, and wherein selecting the at least one solution from the solutions database comprises selecting the at least one solution based on the severity level of the at least one gap and severity levels associated with each of the solutions in the solutions database.

15. The computer program product of claim 12, wherein calculating the at least one gap comprises identifying a principle driving factor associated with the at least one gap, and wherein selecting the at least one solution from the solutions database comprises selecting the at least one solution based on the principle driving factor associated with the at least one gap and principle driving factors associated with solutions in the solutions database.

16. The computer program product of claim 12, wherein calculating the at least one gap comprises:
calculating a severity level of the at least one gap; and
identifying a principle driving factor associated with the at least one gap, and wherein selecting the at least one solution from the solutions database comprises selecting the at least one solution based on the principle driving factor, principle driving factors associated with solutions in the solutions database, the severity level of the at least one gap, and severity levels associated with each of the solutions in the solutions database.

17. The computer program product of claim 12, wherein the output comprises a specification of the selected at least one solution, wherein the specification comprises actionable links to perform functions to implement aspects of the selected at least one solution.

18. The computer program product of claim 17, wherein the specification of the selected at least one solution comprises a principle driving factor associated with the selected at least one solution, a description of an action to be performed as part of the at least one solution, a target of the at least one solution, and an expected benefit of the at least one solution.

19. An apparatus comprising:
a processor; and
a memory coupled to the processor, wherein the memory comprises instructions which, when executed by the processor, cause the processor to:
receive an inferred brand personality for a specified brand;
receive an intended brand personality for the specified brand;
calculate at least one gap between the inferred brand personality and the intended brand personality;
output an output indicating aspects of the at least one gap;
search a solutions database for solutions associated with the at least one gap;
select at least one solution from the solutions database for reducing a size of the at least one gap; and
automatically send a command to a computing system that causes the computing system to initiate an operation to implement the selected at least one solution, wherein selecting the at least one solution from the solutions database comprises:
identifying one or more factors associated with the at least one gap at least by executing a simulation using a predictive model that predicts brand personality assessments for changes in crowdsourcing input data and a corresponding amount of change in the inferred brand personality; and
selecting the at least one solution that minimizes the at least one gap based on results of executing the simulation.

* * * * *